US012709490B2

(12) United States Patent
Pettinga et al.

(10) Patent No.: US 12,709,490 B2
(45) Date of Patent: Aug. 18, 2026

(54) CONVEYOR GAP BLOCKER

(71) Applicant: Flexible Steel Lacing Company, Downers Grove, IL (US)

(72) Inventors: Mark Steven Pettinga, Grandville, MI (US); Parker Jensen, Holland, MI (US)

(73) Assignee: Flexible Steel Lacing Company, Downers Grove, IL (US)

( * ) Notice: Subject to any disclaimer, the term of this patent is extended or adjusted under 35 U.S.C. 154(b) by 84 days.

(21) Appl. No.: 18/781,174

(22) Filed: Jul. 23, 2024

(65) Prior Publication Data

US 2025/0033898 A1 Jan. 30, 2025

Related U.S. Application Data

(60) Provisional application No. 63/528,572, filed on Jul. 24, 2023.

(51) Int. Cl.
*B65G 47/66* (2006.01)
*B65G 13/07* (2006.01)

(52) U.S. Cl.
CPC .................................. *B65G 47/66* (2013.01)

(58) Field of Classification Search
None
See application file for complete search history.

(56) References Cited

U.S. PATENT DOCUMENTS 2,232,081 A 2/1941 Sloane
2,237,345 A 4/1941 Frentzel, Jr. et al.

(Continued)

FOREIGN PATENT DOCUMENTS

CN 1135668 11/1996
CN 2420247 2/2001

(Continued)

OTHER PUBLICATIONS

Notification of Transmittal of the International Search Report and the Written Opinion of the International Searching Authority, or the Declaration from the International Searching Authority issued in International Application No. PCT/US2024/039165 on Dec. 16, 2024, 62 pages.

(Continued)

*Primary Examiner* — Gene O Crawford
*Assistant Examiner* — Muhammad Awais
(74) *Attorney, Agent, or Firm* — Fitch, Even, Tabin & Flannery LLP

(57) ABSTRACT

In one aspect, a roller conveyor gap blocker is provided that includes a body configured to be supported in a gap by upstream and downstream rollers. The body has a plurality of laterally spaced upstream lower members with laterally aligned, upstream lower free end portions. At least one of the upstream lower free end portions has an upstream recessed portion that is above a lowermost end of one of the other laterally aligned, upstream lower free end portions to provide clearance for a drive member. The body has a plurality of laterally spaced downstream lower members of the body with laterally aligned, downstream lower free end portions. At least one of the downstream lower free end portions has a downstream recessed portion that is above a lowermost end of one of the other laterally aligned, downstream lower free end portions to provide clearance for the drive member.

23 Claims, 16 Drawing Sheets

(56) References Cited

U.S. PATENT DOCUMENTS 2,268,724 A 1/1942 Shackelford
2,517,983 A 8/1950 Crosland
2,536,961 A 1/1951 Smith
2,624,444 A 1/1953 Casabona
2,627,960 A 2/1953 Eberle
2,862,599 A 12/1958 Sinden
2,899,086 A 8/1959 Saint-Andre
D209,071 S 10/1967 Koch
3,345,957 A 10/1967 Welch
D209,421 S 11/1967 Fabian
3,465,489 A 9/1969 Monaghan
3,548,996 A 12/1970 Ellis
3,587,674 A 6/1971 Adkin
3,623,598 A 11/1971 Anfossi
3,738,650 A 6/1973 Ossenkop et al.
3,878,735 A 4/1975 Preuss
3,988,880 A 11/1976 Miyazaki et al.
4,096,943 A 6/1978 Gentsch
4,132,304 A 1/1979 Gent
4,288,208 A 9/1981 Kusters
4,579,219 A 4/1986 Burkhardt
4,613,036 A 9/1986 Bourgeois
4,718,543 A 1/1988 Leisner et al.
D303,974 S 10/1989 Karr
4,901,845 A 2/1990 Zoergiebel
4,989,723 A 2/1991 Bode et al.
5,009,307 A 4/1991 Chance et al.
5,044,485 A 9/1991 Loder
5,065,222 A 11/1991 Ishii
5,215,182 A 6/1993 Garbagnati
5,311,982 A 5/1994 Clopton
5,311,983 A 5/1994 Clopton
5,320,478 A 6/1994 Gonsowski et al.
5,324,582 A 6/1994 Goto
5,344,001 A 9/1994 Kawaai et al.
5,409,096 A 4/1995 Clopton
5,584,373 A 12/1996 Layne
5,597,062 A 1/1997 Biwer
5,597,063 A 1/1997 Bogle et al.
5,695,042 A 12/1997 Van Der Burgt
D407,174 S 3/1999 Baker
5,957,265 A 9/1999 Clopton
5,971,129 A 10/1999 Stawniak et al.
D419,742 S 1/2000 Abbestam
6,138,819 A 10/2000 Bogle et al.
6,164,435 A 12/2000 Coen et al.
6,550,604 B2 4/2003 Maclachlan
6,589,631 B1 7/2003 Suzuki
6,630,633 B1 10/2003 Uber et al.
D483,168 S 12/2003 McDaniel
D484,545 S 12/2003 McIlvaine
D493,933 S 8/2004 Schwagermann
6,848,583 B2 2/2005 Largent
6,896,122 B2 5/2005 Gambrell et al.
6,959,803 B1 11/2005 Layne et al.
7,137,505 B2 11/2006 Stebnicki
7,210,569 B1 5/2007 Tarhan et al.
D547,523 S 7/2007 Swinderman
7,258,225 B2 8/2007 Hall
D553,824 S 10/2007 Rijksen
7,287,640 B1 10/2007 Schmutzler
7,413,088 B2 8/2008 Temler
7,523,820 B1 4/2009 Wu et al.
D611,673 S 3/2010 Andrews
7,673,732 B2 3/2010 Underberg
7,721,874 B2 5/2010 Chen
7,882,944 B1 2/2011 Eubanks
D635,847 S 4/2011 Olsson
D643,709 S 8/2011 Olsson
8,042,682 B2 10/2011 Ertel
D650,143 S 12/2011 Bhosale
8,162,133 B2 4/2012 Ruge
8,196,736 B2 6/2012 Wagner
8,210,341 B2 7/2012 Marshall et al.
8,365,899 B2 * 2/2013 McKee .................. B65G 47/66 198/600
8,567,591 B2 10/2013 Gonzalez et al.
9,022,207 B2 * 5/2015 Tully .................. B65G 13/071 198/600
9,022,210 B2 5/2015 Tully
9,027,738 B2 5/2015 Coen
9,290,333 B2 3/2016 Skanse
9,452,896 B2 9/2016 Lee
9,550,625 B2 1/2017 Specht
D780,399 S 2/2017 Pettinga
9,643,784 B2 5/2017 Guerra
9,663,306 B2 * 5/2017 Pettinga ................ B65G 47/66
D789,643 S 6/2017 Pettinga
9,694,987 B1 7/2017 Schroader
9,758,317 B2 9/2017 Sammauro
D819,921 S 6/2018 Pettinga
10,092,122 B2 10/2018 Bing
10,112,131 B2 10/2018 Yoon
10,233,035 B2 3/2019 Pettinga
10,343,853 B2 7/2019 Yasinski
10,376,938 B2 8/2019 Frauenhuber
10,427,891 B2 10/2019 Mckee
10,556,755 B2 2/2020 Pettinga
10,646,898 B2 5/2020 Hillerich, Jr.
10,654,652 B1 5/2020 Folickman
10,913,616 B2 2/2021 Pettinga
10,926,955 B1 * 2/2021 Malina .................. B65G 13/11
11,136,194 B2 10/2021 Sathiyanarayanan
11,186,448 B2 11/2021 Pettinga
11,597,604 B1 * 3/2023 Simon .................. B65G 13/07
11,597,608 B2 3/2023 Pettinga
11,629,010 B1 * 4/2023 DeFant .................. B65G 13/07 198/790
11,661,283 B2 5/2023 Pettinga
11,713,199 B2 8/2023 Pettinga
12,065,313 B2 8/2024 Pettinga
12,071,314 B2 8/2024 Pettinga
D1,064,492 S 2/2025 Pettinga
12,286,302 B2 4/2025 Pettinga
12,365,550 B2 7/2025 Pettinga
2005/0173858 A1 8/2005 Temler et al.
2006/0070966 A1 4/2006 Koudys et al.
2006/0108204 A1 5/2006 Marsetti
2007/0023257 A1 2/2007 Schiesser
2008/0142341 A1 6/2008 Layne et al.
2008/0296129 A1 12/2008 Yagi et al.
2009/0084659 A1 4/2009 Underberg
2010/0108467 A1 5/2010 Barreyre et al.
2010/0230247 A1 9/2010 Mckee
2011/0132725 A1 * 6/2011 Marshall ................ B65G 47/66 198/600
2014/0182733 A1 7/2014 Mettee, II
2014/0183002 A1 7/2014 Tully
2014/0183006 A1 7/2014 Tully
2014/0262684 A1 9/2014 Skanse
2015/0291368 A1 10/2015 Pettinga
2016/0214154 A1 7/2016 Frauenhuber
2017/0008705 A1 1/2017 Sammauro
2017/0055749 A1 3/2017 Bing
2017/0174444 A1 * 6/2017 Schroader .............. B65G 47/66
2017/0246564 A1 8/2017 Yoon
2017/0275102 A1 * 9/2017 Pettinga ................ B65G 47/66
2018/0265309 A1 9/2018 Yasinski
2018/0345324 A1 12/2018 Hillerich, Jr.
2019/0002209 A1 1/2019 Mckee
2020/0346868 A1 11/2020 Sathiyanarayanan
2021/0101757 A1 4/2021 Pettinga
2021/0179365 A1 6/2021 Pettinga
2022/0089374 A1 * 3/2022 Pettinga ................ B65G 13/11
2022/0162016 A1 5/2022 Pettinga
2023/0098268 A1 * 3/2023 Pettinga ................ B65G 47/66 198/600
2023/0102050 A1 * 3/2023 Pettinga ................ B65G 13/07 198/780
2023/0278808 A1 9/2023 Pettinga
2023/0286754 A1 9/2023 Pettinga
2023/0303339 A1 9/2023 Drummond

(56) References Cited

U.S. PATENT DOCUMENTS

| | | | |
|---|---|---|---|
| 2024/0367911 | A1 | 11/2024 | Pettinga |
| 2025/0033898 | A1 | 1/2025 | Pettinga |
| 2025/0058978 | A1 | 2/2025 | Pettinga |

FOREIGN PATENT DOCUMENTS

| | | | | |
|---|---|---|---|---|
| CN | 101056807 | A | 10/2007 | |
| CN | 101074070 | A | 11/2007 | |
| CN | 101203445 | A | 6/2008 | |
| CN | 101880126 | A | 11/2010 | |
| CN | 102695662 | A | 9/2012 | |
| CN | 102887423 | A | 1/2013 | |
| CN | 203448352 | U | 2/2014 | |
| CN | 104870340 | A | 8/2015 | |
| CN | 110691744 | | 1/2020 | |
| CN | 112010006 | A | 12/2020 | |
| DE | 3014608 | | 10/1981 | |
| DE | 3224557 | | 1/1984 | |
| DE | 8700878 | | 3/1987 | |
| DE | 9212012 | U1 | 12/1992 | |
| DE | 19858521 | | 6/2000 | |
| DE | 202006003116 | | 4/2006 | |
| EP | 0156113 | | 10/1985 | |
| EP | 0290255 | | 11/1988 | |
| EP | 0778229 | | 6/1997 | |
| EP | 0906879 | | 4/1999 | |
| EP | 0919493 | | 6/1999 | |
| EP | 2332865 | A1 | 6/2011 | |
| FR | 1561799 | | 3/1969 | |
| GB | 842230 | | 7/1960 | |
| GB | 1116571 | | 6/1968 | |
| GB | 1352993 | | 5/1974 | |
| JP | H07248011 | | 9/1995 | |
| JP | H08133459 | A | 5/1996 | |
| JP | H115264 | | 1/1999 | |
| JP | H11199038 | | 7/1999 | |
| JP | 2000177836 | | 6/2000 | |
| JP | 2001233447 | A | 8/2001 | |
| JP | 2005261873 | | 9/2005 | |
| JP | 2005261873 | A | 9/2005 | |
| JP | 2007155007 | | 6/2007 | |
| JP | 2012138524 | A | 7/2012 | |
| JP | 5181355 | | 4/2013 | |
| JP | 2019210100 | | 12/2019 | |
| KR | 1020120103680 | | 9/2012 | |
| KR | 101299596 | | 8/2013 | |
| NL | 2002344 | | 6/2010 | |
| SU | 590213 | | 1/1978 | |
| SU | 1159859 | | 6/1985 | |
| SU | 1328266 | | 8/1987 | |
| WO | 9856694 | A1 | 12/1998 | |
| WO | 2011071743 | | 6/2011 | |
| WO | 2014106062 | | 7/2014 | |
| WO | 2017111976 | | 6/2017 | |
| WO | 2018191122 | | 10/2018 | |
| WO | 2020216783 | | 10/2020 | |
| WO | WO-2020216783 | A1 * | 10/2020 | ............. B65G 13/07 |

OTHER PUBLICATIONS

U.S. Appl. No. 16/019,843, filed Jun. 27, 2018, Mckee.

U.S. Appl. No. 62/503,118, filed May 8, 2017, Pettinga.

U.S. Appl. No. 62/526,641, filed Jun. 29, 2017, Mckee.

U.S. Appl. No. 17/170,450, filed Feb. 8, 2021.

U.S. Appl. No. 29/829,490, filed Mar. 4, 2022; 24 pages.

English Translation of 1st Rectification Notice mailed Dec. 9, 2022 in Chinese Application No. 202222547057.6, 3 pages.

Notification of Transmittal of the International Search Report and the Written Opinion of the International Searching Authority, or the Declaration from the International Bureau of WIPO issued in International Application No. PCT/US22/44568 on Jan. 3, 2023, 25 pages.

U.S. Appl. No. 18/125,417, filed Mar. 23, 2023; 45 pages.

U.S. Appl. No. 18/813,933, filed Aug. 23, 2024, entitled "Conveyor Transfer Guards"; 136 pages.

U.S. Appl. No. 18/766,600, filed Jul. 8, 2024, 36 pages.

"Invitation to Pay Additional Fees, and Where Applicable, Protest Fee" mailed in related International Application No. PCT/US2024/039165 on Sep. 24, 2024, 2 pages.

U.S. Appl. No. 18/766,600; Notice of Allowance and Fees Due (PTOL-85) mailed Aug. 25, 2025; (pp. 1-8).

U.S. Appl. No. 18/766,600; Non-Final Rejection mailed May 8, 2025; (pp. 1-9).

* cited by examiner

CONVEYOR GAP BLOCKER

CROSS-REFERENCE TO RELATED APPLICATION

This application claims the benefit of U.S. Provisional Patent App. No. 63/528,572, filed Jul. 24, 2023, which is hereby incorporated by reference in its entirety herein.

FIELD

This disclosure relates to conveyors and, more specifically, to gap blockers that block gaps between conveying surfaces of conveyors.

BACKGROUND

Conveyors have conveying surfaces to support an object and convey the object in a downstream direction along the conveyor. Conveyors often have gaps between conveying surfaces of the conveyor that permit relative movement of the conveying surfaces. The conveying surfaces may be outer surface portions of adjacent belts, outer surface portions of a single belt (e.g., a hitch in the belt), or outer surfaces of adjacent rollers, as some examples.

One type of conveyor system is a roller conveyor. Roller conveyors are used to transfer objects from one location to another, such as packages in a package distribution center or products in a manufacturing environment. Roller conveyors often have rollers that are rotatably supported by a conveyor frame at fixed positions along the conveyor frame. The rollers support an object on the roller conveyor and rotate to convey the object in a downstream direction.

Roller conveyors include passive roller conveyors and active conveyors. Passive roller conveyors utilize gravity or the momentum of an object to move the object across the rollers of the roller conveyor. An active roller conveyor utilizes a drive, such as an electric motor coupled to a rotatable drive member, to rotate the rollers of the roller conveyor and urge an object in a downstream direction along the rollers. For example, the roller conveyor may have rollers, a driver such as a drive belt in contact with the rollers, and the rotatable drive member is a drive roller engaged with the drive belt that moves the drive belt to cause corresponding rotation of the rollers. As another example, a roller conveyor may include rollers with sprockets, a chain engaged with the sprockets, and the rotatable drive member is a drive sprocket that moves the chain to cause rotation of the rollers.

Some other roller conveyors have rollers and drive members such as o-rings that engage in grooves of the rollers for transferring rotation from one roller to an adjacent roller. The o-ring extends about the rollers in their grooves and has upper and lower runs that extend across the gap between the adjacent rollers. The areas of the roller conveyor where the o-ring enters the grooves of the rollers create potential pinch points that may be a hazard for workers. For example, a worker's glove may become caught between an o-ring and a roller as a worker attempts to dislodge an object stuck on the roller conveyor.

Further, an item may fall through one of the gaps between rollers and into an underlying area. Objects that fall through the gaps between rollers may damage an underlying structure, such as jamming a drive pulley that drives the rollers. As another example, a portion of an object such as a corner of a box may become lodged in a gap between rollers. These situations may adversely affect the operation of the roller conveyor and nearby machinery.

SUMMARY

In one aspect of the present disclosure, a gap blocker is provided for a roller conveyor having upstream and downstream rollers for conveying an object in a downstream longitudinal direction and a gap between the upstream and downstream rollers. The gap blocker includes a body configured to be supported in the gap by the upstream and downstream rollers as the upstream and downstream rollers rotate during operation of the roller conveyor. The body has an upper blocking portion to inhibit the object from falling through the gap. The body includes a plurality of laterally spaced upstream lower members having laterally aligned, upstream lower free end portions to be positioned below the narrowest portion of the gap for keeping the body in the gap. At least one of the upstream lower free end portions has an upstream recessed portion that is above a lowermost end of one of the other laterally aligned, upstream lower free end portions to provide clearance for a drive member. The body further includes a plurality of laterally spaced downstream lower members having laterally aligned, downstream lower free end portions to be positioned below the narrowest portion of the gap for keeping the body in the gap. At least one of the downstream lower free end portions has a downstream recessed portion that is above a lowermost end of one of the other laterally aligned, downstream lower free end portions to provide clearance for the drive member. In this manner, the upstream and downstream recessed portions of the upstream and downstream free end portions provide clearance for the drive member while permitting the upstream and downstream lower members to keep the gap blocker in the gap.

Further, the laterally aligned upstream free end portions and the laterally aligned downstream free end portions permit the gap blocker to be slid or otherwise moved in lateral directions between a plurality of lateral positions along the upstream and downstream rollers during installation of the gap blocker in the gap. The laterally aligned upstream free end portions and the laterally aligned downstream free end portions may thereby slide along, or be spaced from, the upstream and downstream rollers to facilitate positioning of the gap blocker at a desired lateral position along the upstream and downstream rollers rather than being constrained to installation at a single lateral position along the upstream and downstream rollers.

The present disclosure also provides a roller conveyor gap blocker having a body configured to be supported in a gap between upstream and downstream rollers as the upstream and downstream rollers rotate during operation of the roller conveyor. The body includes an upper blocking portion of the body to be positioned above a narrowest portion of the gap and inhibit the object from falling through the gap. The body further includes upstream and downstream lower members having upstream and downstream lower end portions to be positioned below the narrowest portion of the gap to keep the body in the gap. The body further includes a lateral biasing member depending from the upper blocking portion and having a lower free end portion. The lateral biasing member further includes a removable portion extending laterally from the lower free end portion for contacting a member of the roller conveyor extending longitudinally between the rollers. An installer can leave the removable portion connected to the lower free end portion of the lateral biasing member if the lateral biasing member of the gap blocker is to be positioned near the member of the roller conveyor. Alternatively, the installer can remove the removable portion if the lateral biasing member of the gap blocker is to be positioned near another gap blocker.

In another aspect, the present disclosure provides a retainer for a gap blocker for a roller conveyor having upstream and downstream rollers rotatable to convey an object in a downstream longitudinal direction across a gap between the upstream and downstream rollers. The retainer includes a mounting portion to be positioned laterally outward of the gap and an engagement member for extending laterally into the gap from the mounting portion. The retainer further includes a stop portion of the engagement member configured to extend longitudinally into a laterally extending spacing between legs of the gap blocker and limit lateral movement of the gap blocker in the gap. In this manner, the retainer interfaces with lateral spacings between legs of the gap blocker to keep the gap blocker at a desired lateral position in the gap.

DETAILED DESCRIPTION

Figure 1:
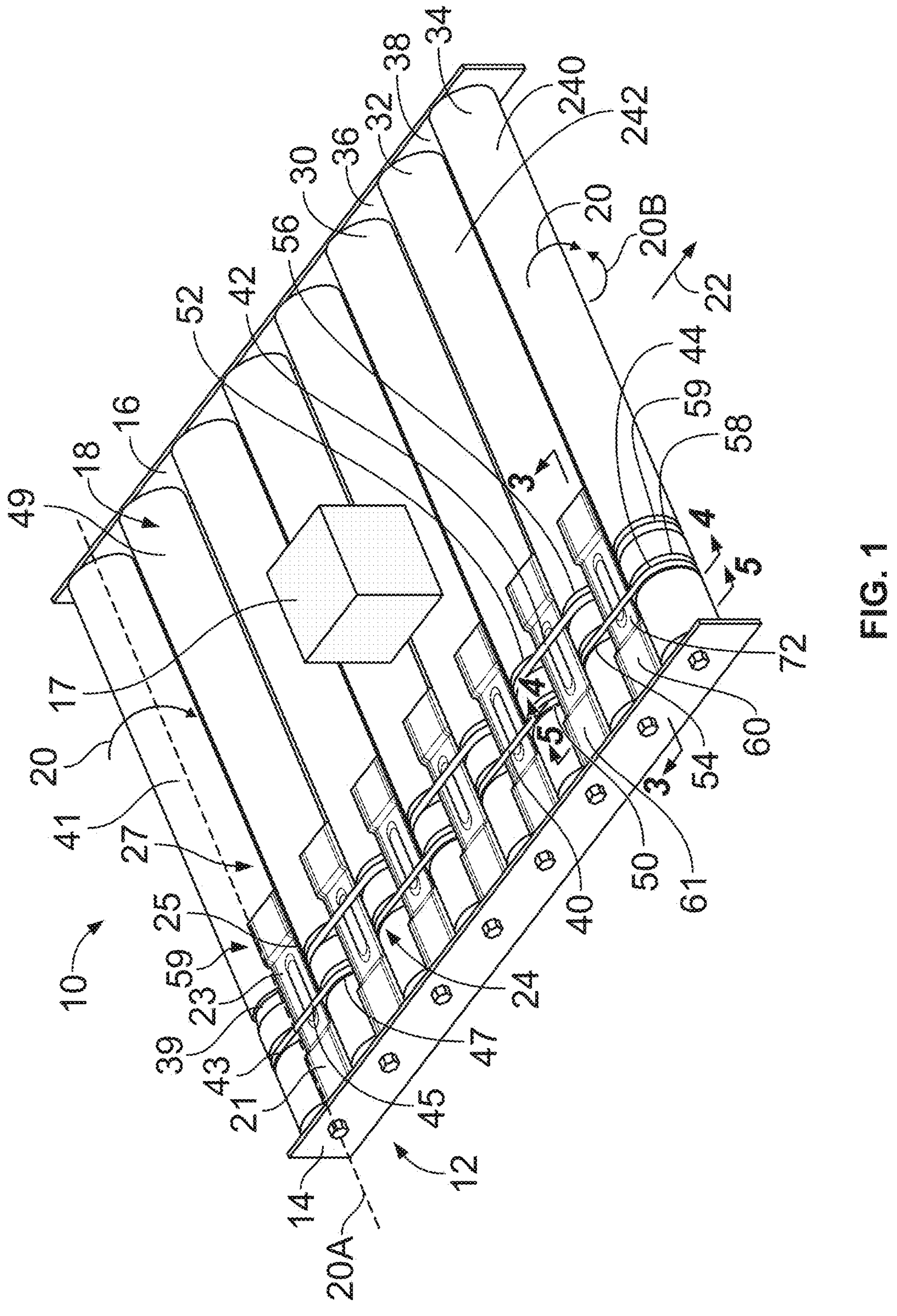
FIG. 1 is a perspective view of a roller conveyor having rollers, o-rings to facilitate rotation of the rollers, and gap blockers in gaps between the rollers.

Regarding FIG. 1, a roller conveyor 10 is provided having a stationary conveyor frame 12 including longitudinally extending side frame members 14, 16 and laterally extending rollers 18 rotatably mounted thereto. The rollers 18 are each rotatable in a rotating direction 20 around a respective axis 20A to convey an object 17 in a downstream longitudinal direction 22 while the side frame members 14, 16 remain stationary. The roller conveyor 10 includes one or more drive members, such as o-rings 24, that interconnect the rollers 18 for transferring rotation between the rollers 18.

The roller conveyor 10 includes gap blockers 59 that are sized to fit in gaps 27 between the rollers 18. The gap blockers 59 are supported in the gaps 27 by the rollers 18. The gap blockers 59 slidingly contact the rollers 18 as the rollers 18 rotate. With the gap blockers 59 supported in the gaps 27, the gap blockers 59 each have upstream and downstream outboard portions 23, 25 disposed adjacent the corresponding upstream and downstream rollers 18 to obstruct an object, such as a worker's glove, from being positioned in the pinch points between the rollers 18 and the o-rings 24 extending around the upstream and downstream rollers 18. Further, with the gap blockers 59 supported in the gaps 27, the gap blockers 59 are sized and configured so that upper surfaces 21 of the gap blockers 59 are positioned to limit how far a conveyed object may extend downward into the gaps 27. The gap blockers 59 thereby inhibit objects from becoming wedged between the rollers 18 or falling through the gaps 27. The roller conveyor 10 of FIG. 1 is shown with one gap blocker 59 per gap 27; however, two or more gap blockers 59 may be installed in each gap 27 such as in a side-by-side orientation.

The rollers 18 include roller 41 and an adjacent downstream roller 49 at an upstream end of the roller conveyor 10. A drive motor may be connected to an o-ring engaged with a groove 39 of the roller 41 such that operation of the motor causes the roller 41 to rotate in rotating direction 20. The o-rings 24 include an o-ring 45 engaged in a groove 43 of roller 41 and engaged in a groove 47 of the roller 49. Rotation of the roller 41 in direction 20 causes movement of the o-ring 45 which, in turn, causes rotation of the roller 49 in direction 20. Thus, the rollers 18 rotate and the o-rings 24 travel between grooves of the rollers 18 during operation of the roller conveyor 10 while the conveyor frame 12 including the side frame members 14, 16 remain stationary. The o-rings may be made of a polymer material, such as a rubber or an elastomeric material.

Referring now to the downstream end of the roller conveyor 10 in FIG. 1, the rollers 18 include rollers 30, 32, 34 and the gaps 27 include gaps 36, 38 between the rollers 30, 32, 34. The o-rings 24 include o-rings 40, 42, 44 that are engaged in grooves 50, 52, 54, 56, 58 of the respective rollers 30, 32, 34. The gap blockers 59 include a gap blocker 60 in the gap 38 between the rollers 32, 34. Gap blocker 60 will be discussed below, but the remaining gap blockers 59 of the roller conveyor 10 are similar to the gap blocker 60.

Figure 2:
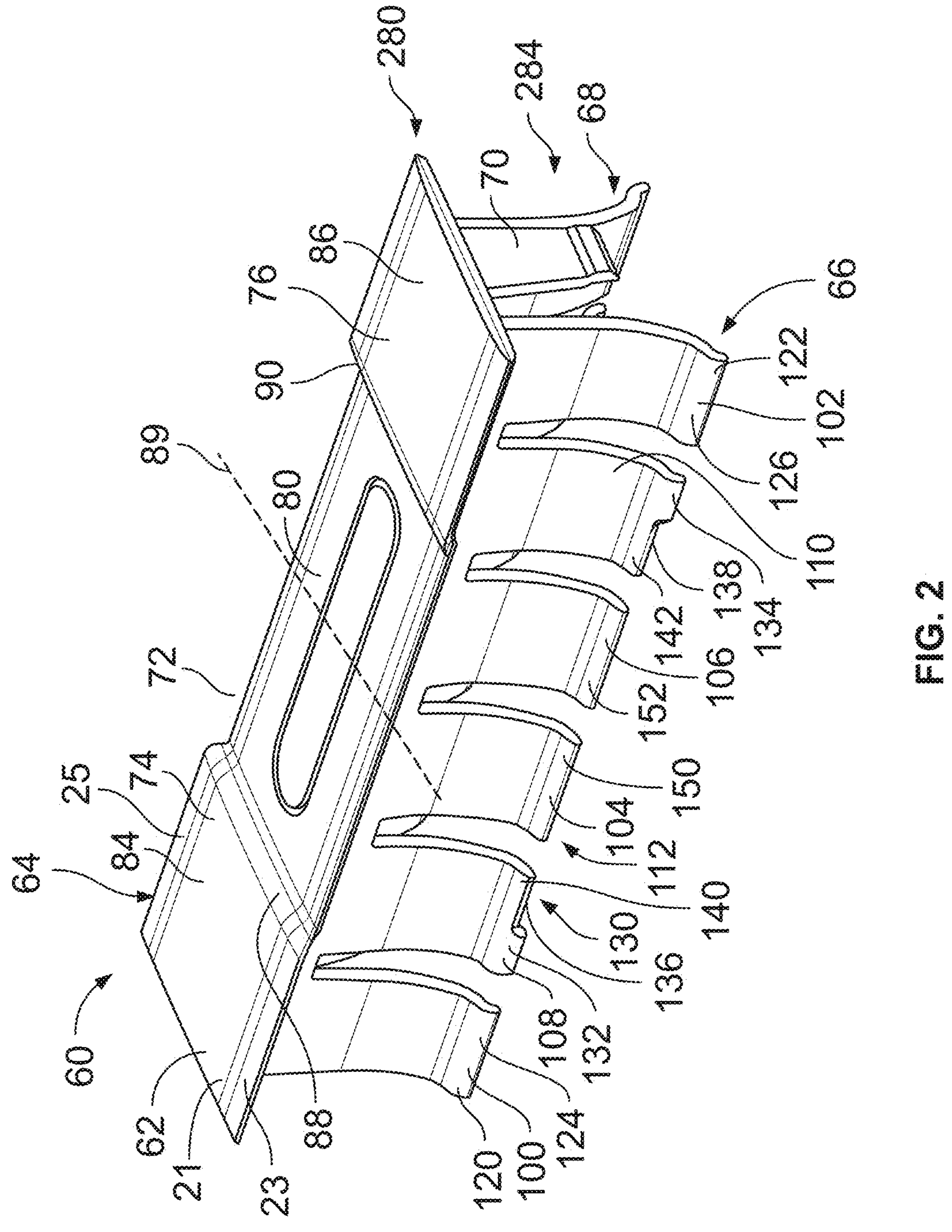
FIG. 2 is a front perspective view of one of the gap blockers of FIG. 1 showing an upper blocking portion of the gap blocker having an upper recess or channel for providing clearance for an upper run of an o-ring and a lower clearance area formed by cooperating central leg portions of the gap blocker for providing clearance for a lower run of the o-ring.

Regarding FIG. 2, the gap blocker 60 has a body 62 with an upper portion 280 including an upper blocking portion 64. The body 62 has a lower portion 284 including upstream leg portions 66 and downstream leg portions 68. The body 62 further includes lateral biasing members such as resilient arms 70, 71. In some embodiments, the upstream and downstream leg portions 66, 68 are resilient to permit one or more of the upstream and downstream leg portions 66, 68 to be deflected to facilitate advancing of the upstream and downstream leg portions 66, 68 into the gap 38. The gap blocker 60 is similar in some respects to the gap blockers described in U.S. patent application Ser. No. 18/117,076, filed Mar. 3, 2023, which is hereby incorporated by reference in its entirety.

The body upper and lower portions 280, 284 include an upper and lower recess 72, 112, respectively. The recesses 72, 112 are configured to provide clearance for the o-rings 24. The gap blocker 60 can be installed in one of the gaps 27 so that the upper and lower recesses 72, 112 are generally below and above the upper and lower runs of an o-ring 24. In this manner, the gap blocker 60 provides clearance for the o-ring 24 as well as operating to block the gap 27 and limit access to a pinch point between the upper run of the associated o-ring 24 and roller 18.

More specifically, the upper blocking portion 64 includes a wide, upper channel or recess 72 that provides clearance for an upper run of one of the o-rings 24 and raised portions 74, 76 on either side of the upper recess 72. The upper surface 21 has a stepped profile that includes upper surface portions 84, 86 of the raised portions 74, 76; a lowered, recessed surface portion 80; and transition surface portions 88, 90 connecting the recessed surface portion 80 and the upper surface portions 84, 86. The gap blocker 60 is symmetrical about a central longitudinal plane extending through an axis 89 orthogonal to the recessed surface portion 80, such that the upper recess 72 is centered on the gap blocker 60. The centered upper recess 72 improves the case of installation of the gap blocker 60 because the wide, upper recess 72 can be aligned and in clearance with an upper run 170 (see FIG. 4) of the o-ring 44 regardless of which outboard portion 23, 25 is positioned adjacent the roller 32 (see FIG. 1).

Regarding FIG. 2, the upstream leg portions 66 include upstream end leg portions 100, 102, upstream intermediate leg portions 104, 106, and upstream transition leg portions 108, 110. The upstream intermediate leg portions 104, 106 and upstream transition leg portions 108, 110 form a recess 112 for receiving a lower run 174 (see FIG. 4) of the o-ring 44. The upper recess 72 and the lower recess 112 are sufficiently wide to accommodate some lateral misalignment of the gap blocker 60 from the upper and lower runs 170, 174 of the o-ring 24 while maintaining the ability of the gap blocker 60 to obstruct the pinch point between the upper run 170 and the groove 58 of the roller 34 (see FIG. 4).

Figure 5:
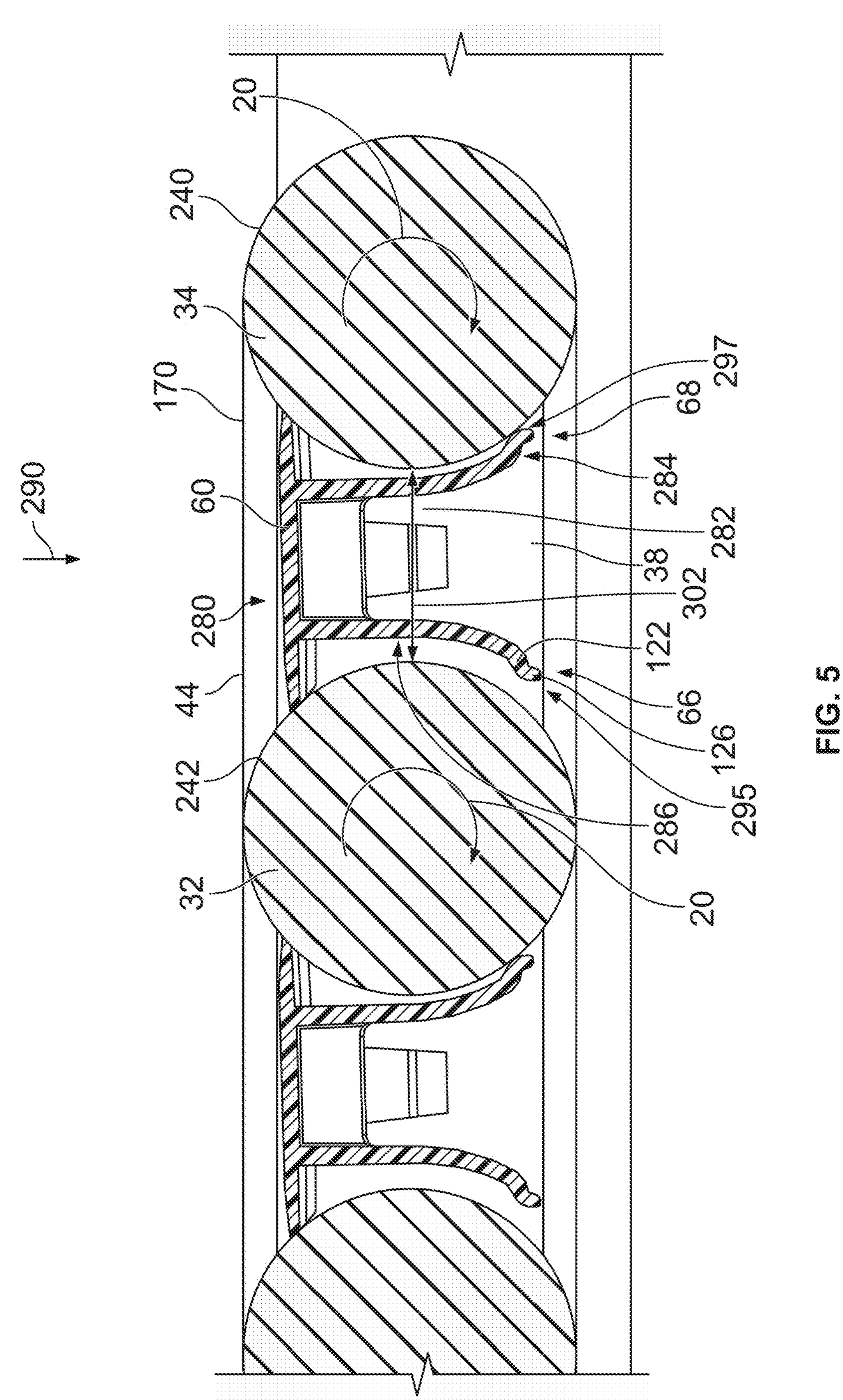
FIG. 5 is a cross-sectional view taken along line 5-5 of FIG. 1 showing an upstream leg portion of the gap blocker completely spaced from an upstream roller.

The upstream end leg portions 100, 102 have distal end portions 120, 122 with downwardly extending foot portions 124, 126, as shown in FIG. 5. Returning to FIG. 2, the upstream transition leg portions 108, 106 each have a notched profile 130 with a truncated foot portion 132, 134 and a recessed portion 136, 138. The recessed portions 136, 138 have surface portions 140, 142 that may contact the roller 32 to limit movement (e.g., rattling or lifting of the outboard portion 23) of the gap blocker 60 in the gap 38 while the notched profile 130 provides additional clearance for the lower run 174 of the o-ring 44. The recessed portions 136, 138 are recessed above lowermost ends of other ones of the upstream leg portions 66.

Figure 4:
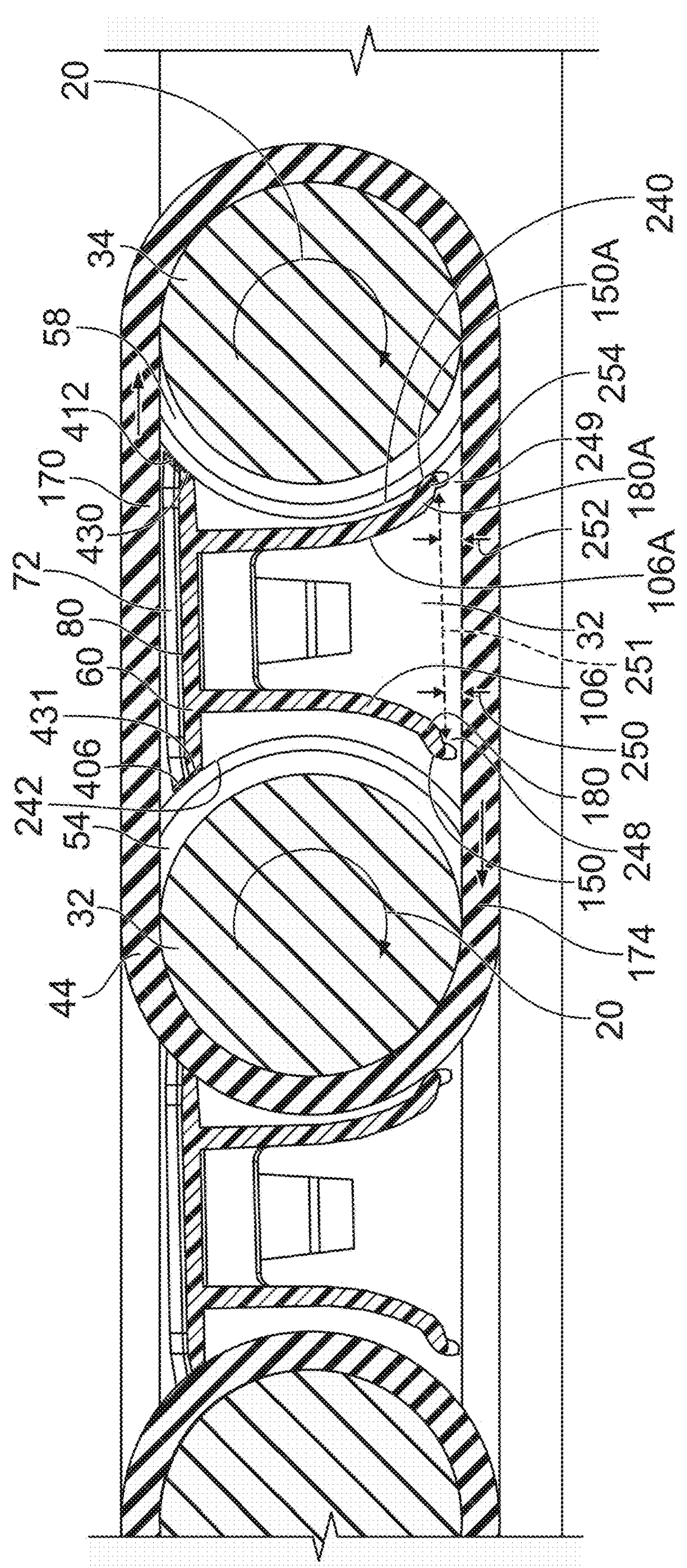
FIG. 4 is a cross-sectional view taken along line 4-4 of FIG. 1 showing the central shorter leg portions of the gap blocker for forming the clearance area for the lower run of the o-ring.

Regarding FIGS. 2 and 4, the upstream intermediate leg portions 104, 106 have surface portions 150, 152 that may occasionally contact the roller 32 to limit movement of the gap blocker 60 while normally being spaced from the roller 32 during operation of the roller conveyor 10. The intermediate leg portions 104, 106 are shorter than the upstream end leg portions 100, 102 to provide additional clearance for the lower run 174 of the o-ring 44.

Figure 3:
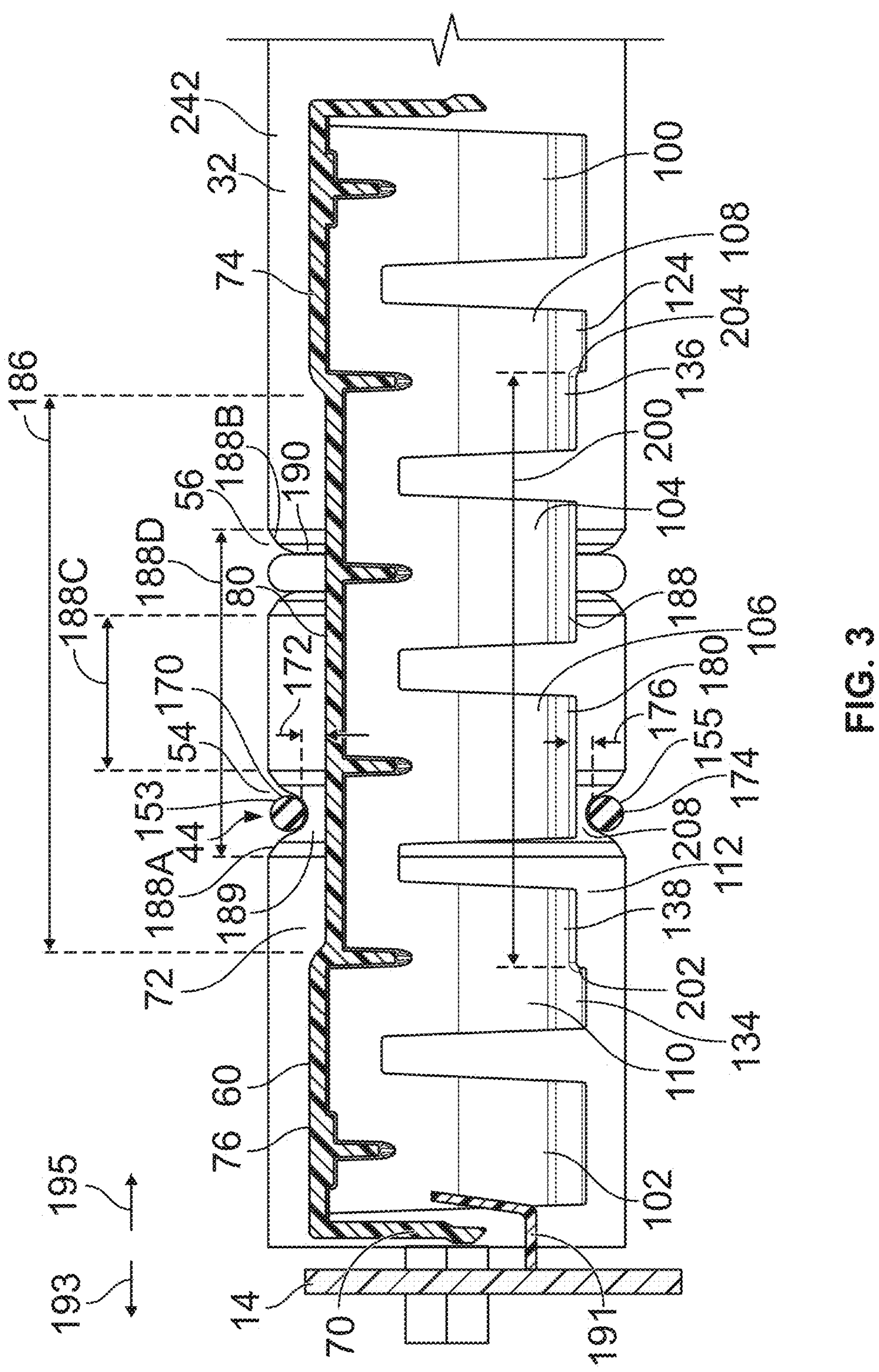
FIG. 3 is a cross-sectional view taken along line 3-3 of FIG. 1 showing upper and lower runs of an o-ring extending above and below a gap blocker of the roller conveyor.

Regarding FIG. 3, the upper run 170 of the o-ring 44 is spaced a distance 172 above the recessed surface portion 80 and the lower run 174 is spaced a distance 176 below distal end portions 180, 188 of the upstream intermediate leg portions 104, 106. The upper recess 72 has a width 186 that is wider than a maximum grooved width 188D of the grooves 54, 56 along the roller 32. The maximum grooved width 188D is the distance between a side surface portion 188A of the groove 54 closest to the side frame member 14 and a side surface portion 188B of the groove 56 farthest away from the side frame member 14. The maximum grooved width 188D encompasses the maximum width the o-rings 44, 42 can occupy along the roller 32. Each groove 54, 56 includes an annular, concave surface 189 with a curvature configured to center the o-rings 44, 46 in the grooves 54, 56. As shown in FIG. 3, the o-ring 44 has upper and lower surface portions 153, 155 that are substantially flush with the cylindrical outer surface 242 of roller 32.

The clearance area or lower recess 112 likewise has a width 200 between side surface portions 202, 204 of the truncated foot portions 124, 134 that is wider than the maximum grooved width 188. In this manner, both the upper channel or recess 72 and the lower clearance area or recess 112 are wide enough to provide clearance for an o-ring in either groove 54, 56. The aligned, wide upper and lower recesses 72, 112 improve the case of installation since the gap blocker 60 may be positioned in gap 38 where the o-ring 44 is engaged in grooves 54, 58 or in gap 36 where the o-ring 42 is engaged in grooves 52, 56 that are laterally offset from grooves 43, 56 by lateral spacing 188C. Further, the intermediate leg portions 106, 104 laterally overlap the grooves 54, 56, respectively, to provide a vertical spacing 208 between the distal end portion 180 and the lower run 174 as shown in FIG. 3. The recessed portions 136, 138 of the upstream transition leg portions 108, 110 are likewise configured to provide substantially the same vertical spacing between the recessed portions 136, 138 and the lower run of an o-ring in the event that the gap blocker 60 shifts laterally far enough during operation (or was installed) such that either of the upstream transition leg portions 108, 110 are in alignment with the lower run of the o-ring.

Regarding FIG. 3, the illustrated roller conveyor 10 includes a retainer 191 configured to be in interference with the resilient arm 70 of the gap blocker 60 so the retainer 191 can contact the resilient arm 70 and limit lateral movement of the gap blocker 60 in direction 195 in the gap 38. The side frame member 14 is positioned to contact the gap blocker 60 and limit lateral movement of the gap blocker 60 in direction 193. In this manner, the gap blocker 60 is kept at a predetermined lateral position or area along the rollers 32, 34 such that the upper recess 72 is aligned with the upper run 170 of the o-ring 44 and the lower recess 112 is aligned with the lower run 174 of the o-ring 44. In another embodiment, the retainer 191 has surfaces on either side of the resilient arm 70 to contact the resilient arm 70 and limit lateral movement of the gap blocker 60 in directions 193, 195.

In other embodiments, the retainer 191 may not be used. For example, the roller conveyor 10 may have a lateral width such that three gap blockers 60 fit snug side-by-side in the gap 38. In this instance, the gap blockers 60 and side frame members 14, 16 limit lateral movement of each of the gap blockers 60 in the gap 38. The resilient arms 70, 71 of the gap blockers 60 in the gap 38 are deflected by the corresponding resilient arms 70, 71 of the adjacent gap blockers 60 and the side frame member 14. The deflected resilient arms 70, 71 react to this deflection by resiliently urging the gap blockers 60 away from one another and the side frame members 14, to provide a similar lateral spacing between each of the gap blockers 60 in the gap 38. As another example, a single gap blocker 60 can be installed in the gap 38 with the gap blocker 60 including a protrusion that engages in one or more of the grooves of the rollers 32, 34 to limit lateral movement of the gap blocker along the rollers 32, 34. In yet another example, a single gap blocker 60 may be provided in the gap 38 and cylindrical outer surfaces 242, 240 (see FIG. 4) of the rollers 32, 34 are sufficiently true and free of imperfections that the sliding contact between the cylindrical outer surfaces 242, 240 keeps the gap blocker 60 in a predetermined lateral position along the rollers 32, 34, e.g., the position of gap blocker 60 in FIG. 1.

Figure 9:
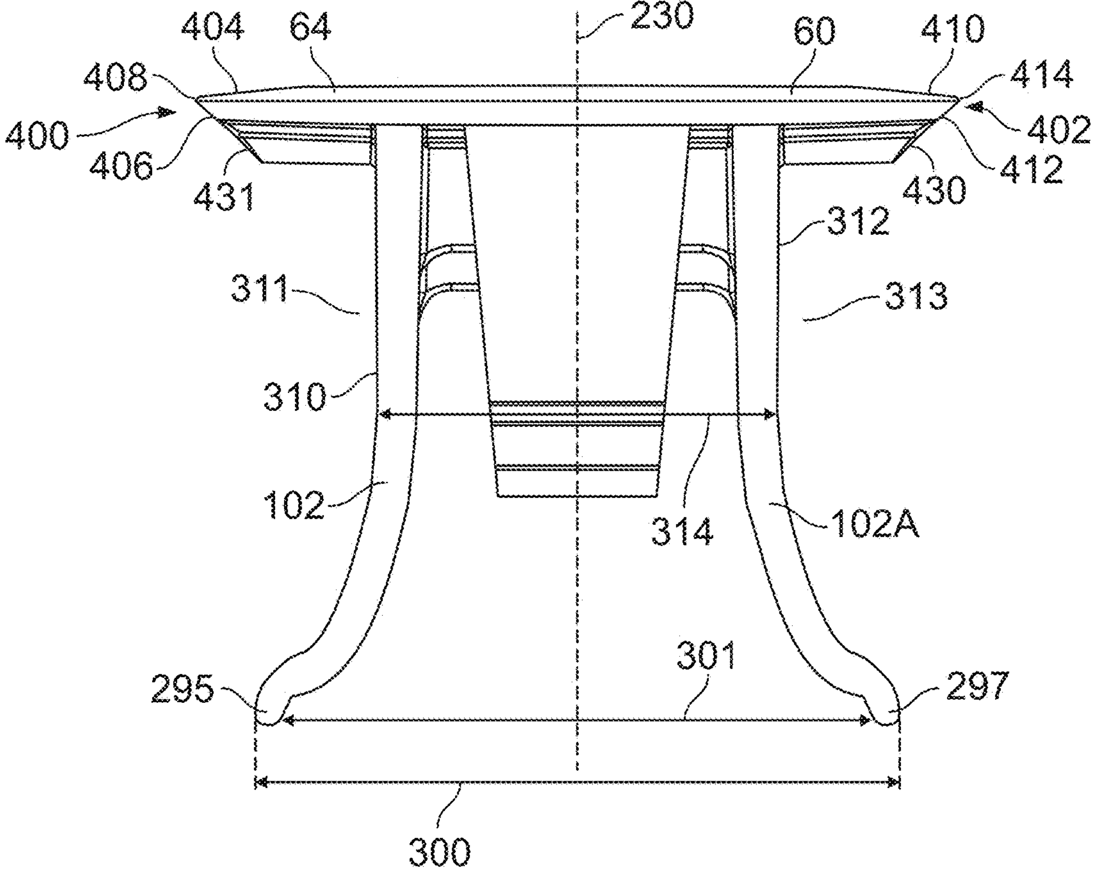
FIG. 9 is an end elevational view of the gap blocker of FIG. 2 showing a shorter end bracing end wall and an adjacent, taller intermediate bracing wall.

Regarding FIG. 9, in one embodiment, the gap blocker 60 is symmetrical about a vertical and central laterally extending plane as indicated by axis 230. Regarding FIG. 6, the downstream leg portions 68 are identical to the corresponding upstream leg portions 66 and include downstream end leg portions 100A, 102A, transition leg portions 108A, 110A, and downstream intermediate leg portions 104A, 106A. The downstream leg portions 68 are similar to the upstream leg portions 66 to facilitate positioning of either the upstream or downstream leg portions 66, 68 proximate the roller 32 which improves ease of installing the gap blocker 60 in the gap 38, as previously discussed.

Regarding FIG. 4, the upstream intermediate leg portion 106 has a distal end portion 180 that is spaced from the cylindrical outer surface 242 of the roller 32 during operation of the roller conveyor 10. However, the outer surface portion 150 of the distal end portion 180 may occasionally contact the roller 32 to settle or otherwise limit upward or clockwise (when viewed in FIG. 4) movement of the gap blocker 60 in the gap 38 during operation of the roller conveyor 10. The downstream intermediate leg portion 106A has a distal end portion 180A that may be in contact with the cylindrical outer surface 240 of the roller 34 during operation of the roller conveyor 10. This is due to the rotary forces on the gap blocker 60, and specifically on the outboard portions 23, 25, during conveyor operation that tend to cause slight tilting of the gap blocker 60 in the gap.

The short, upstream and downstream intermediate leg portions 104, 104A create vertical clearance spacings 248, 249 with spacings 250, 252 between the distal end portions 180, 180A and the lower run 174 of the o-ring 44. The upstream and downstream intermediate leg portions 106, 106A as well as the recessed portions 136, 138 of leg portions 108, 108A, 110, 110A create similar vertical clearance spacings.

Due to tilting of the gap blocker 60 in the gap 38 during operation of the roller conveyor 10, the spacing 250 may be larger than spacing 252. However, both of the distal end portions 180, 180A are sufficiently spaced from the lower run 174 of the o-ring 44 to accommodate movement of the gap blocker 60 (e.g., changes in the tilt of the gap blocker 60) and/or o-ring 44 (e.g., up-and-down movement of the lower run 174 due to vibrations) during operation of the roller conveyor 10.

With continued reference to FIG. 4, the short upstream and downstream intermediate leg portions 106, 106A, 108, 108B and the recessed portions 136, 138 of the leg portions 108, 108A, 110, 110A form an upper plane 251 of the lower recess 112. The lower recess 112 has an upper boundary at the upper plane 251 and laterally bounded by side surface portions 202, 204 of the leg portions 110, 110A and 108, 108A (see FIG. 3). In this manner, the gap blocker 60 has an upper channel formed in the material of the upper blocking portion 64 by the recess 72 (see FIG. 2) whereas the gap blocker 60 has a lower channel formed in the material of the lower portion 284 by the distal ends of the leg portions 104, 104A, 106, 106A, 108, 108A, 110, 110A. The upper and lower matching channels or recesses 72, 112 facilitate an elongate object travelling longitudinally relative to the gap blocker 60 such as a chain or runs of an o-ring.

Regarding FIG. 5, the upper portion 280 of the gap blocker 60 is above a narrowest portion 282 of the gap 38, the lower portion 284 is below the narrowest portion of the gap 38, and an intermediate portion 286 extending in the narrowest portion 282 of the gap 38. In one embodiment, the upstream and downstream leg portions 66, 68 are resilient and permit an installer to deflect one or more of the upstream and downstream leg portions 66, 68 to temporarily narrow the longitudinal spacing between the leg portions 66, 88 and facilitate advancing of the gap blocker 60 downward in direction 290 into the gap 38. Once lower end portions 295, 297 of the leg portions 66, 68 have been advanced downward below the narrowest portion 282 of the gap 38, the installer releases the deflected one or more leg portions 66, 68 and the deflected one or more leg portions 66, 68 resiliently returns to its undeflected configuration.

During typical operation of the roller conveyor 10, the upstream leg portions 66 including upstream intermediate leg portions 104, 106 will be undeflected and the lower end portions 295 are spaced from the cylindrical outer surface 242 of the roller 32 as shown in FIG. 5. The downstream leg portions 68 including intermediate leg portions 104A, 106A will be undeflected or slightly or minimally deflected and the lower end portions 297 of the downstream leg portions 68 are in occasional or consistent sliding contact with the cylindrical outer surface 242 of the roller 32 depending on the condition of the cylindrical outer surface 242 of the roller 32. For example, the cylindrical outer surface 242 may have a localized imperfection that contacts one or more of the downstream leg portions 68 with each rotation of the roller 32.

As can be seen in FIG. 5, the lower end portions 295, 297 have a maximum width 300 (see FIG. 9) when the gap blocker 60 is installed in the gap 38 that is larger than a minimum width 302 of the gap 38 at the narrowest portion 282 of the gap 38. When the lower end portions 295, 297 have the maximum width 300, the lower end portions 295, 297 have a longitudinal spacing 301 between the lower end portions 295, 297. Regarding FIG. 9, the upstream and downstream leg portions 66, 68 have outer surfaces 310, 312 and a longitudinal spacing 314 between the outer surfaces 310, 312 that is less than the minimum longitudinal gap spacing or width 302 of the gap 38. In this manner, the gap blocker 60 has upstream and downstream recessed areas 311, 313 that receive portions of the roller 32, 34 therebetween and, more specifically, generally under the overhanging outboard portions 23, 25 and generally above the outwardly extending lower end portions 295, 297. The upper and lower portions 280, 284 are able to contact the rollers 32, 34 to keep the gap blocker 60 in the gap 38.

Figure 6:
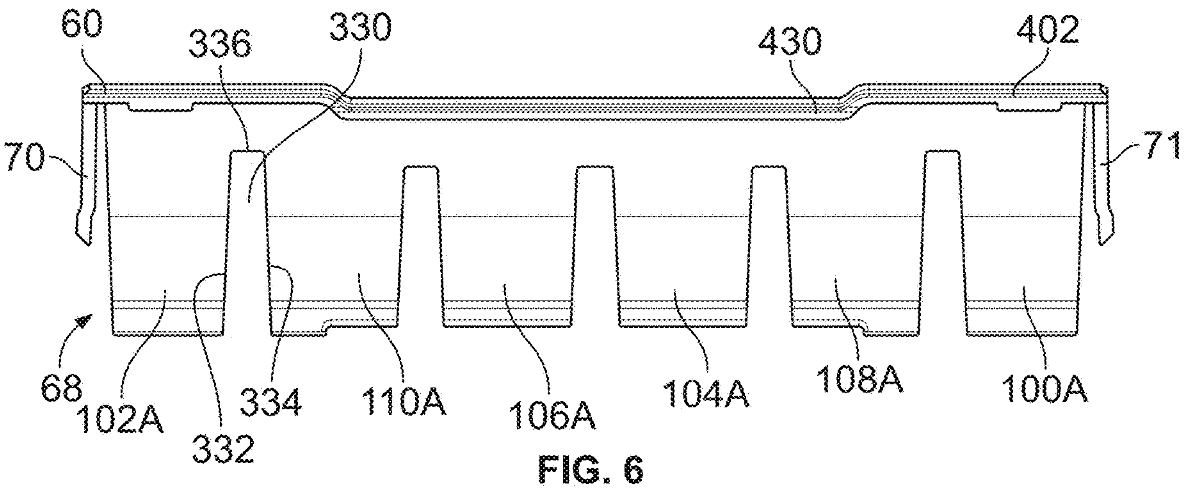
FIG. 6 is a rear elevational view of the gap blocker of FIG. 2.

Regarding FIG. 6, the gap blocker has lateral spacings between laterally adjacent upstream and downstream leg portions 66, 68, such as a formed closed ended-slots 330. Each closed-ended slot 330 is defined between side surfaces 332, 334 of the adjacent leg portions 102A, 110A and a flat surface 336 that ends the slot 330 at its upper end while its lower end is open. Regarding FIG. 8, the gap blocker has longitudinally aligned pairs of leg portions 66, 68, including leg portions 102, 102A; 110, 110A; 106, 106A; 104, 104A; 108, 108A; and 100, 100A. The longitudinally aligned pairs of leg portions 66, 68 have longitudinal spaces 350, 352, 354, 356, 358, 360 therebetween. In this manner, each of the downstream leg portions 68 is laterally spaced from the other adjacent downstream leg portions 68 and is longitudinally spaced from the longitudinally aligned upstream leg portion 66. The spacings between the upstream and downstream leg portions 66, 68 permit each of the upstream and downstream leg portions 66, 68 to flex independently to accommodate deviations in the cylindrical outer surfaces 240, 242 of the rollers 32, 34 as well as be individually deflected during installation of the gap blocker 60 in the gap 38.

Regarding FIG. 9, the upper blocking portion 64 includes an upper, upstream contact portion 400 for slidingly contacting the roller 32 and an upper, downstream contact portion 402 for slidingly contacting roller 34 as the rollers 32, 34 rotate. The upper upstream contact portion 400 includes an upper inclined surface portion 404, a lower inclined surface portion 406, and a juncture 408 therebetween. Likewise, the upper downstream portion 402 includes an upper inclined surface portion 410, a lower inclined surface portion 412, and a juncture 414 therebetween. As can be seen in FIG. 5, the lower inclined surface portions 406, 412 are configured so that they can closely rest on either roller 32, 34 depending on which roller 32, 34 the inclined surface portion 406, 412 is positioned against. The junctures 408, 414 are adjacent the cylindrical outer surfaces 240, 242 of the rollers 32, 34 to limit objects from wedging below the upper blocking portion 64 of the gap blocker 60. The lower inclined surfaces portion 406, 412 minimize the contact area between the upper upstream and downstream contact portions 400, 402 and the rollers 32, 34 by providing a slight undercut that forms a gap spacing between the lower inclined surface portions 406, 412 as the lower inclined surface portions 406, 412 extend inboard away from the junctures 408, 414.

Figure 7:
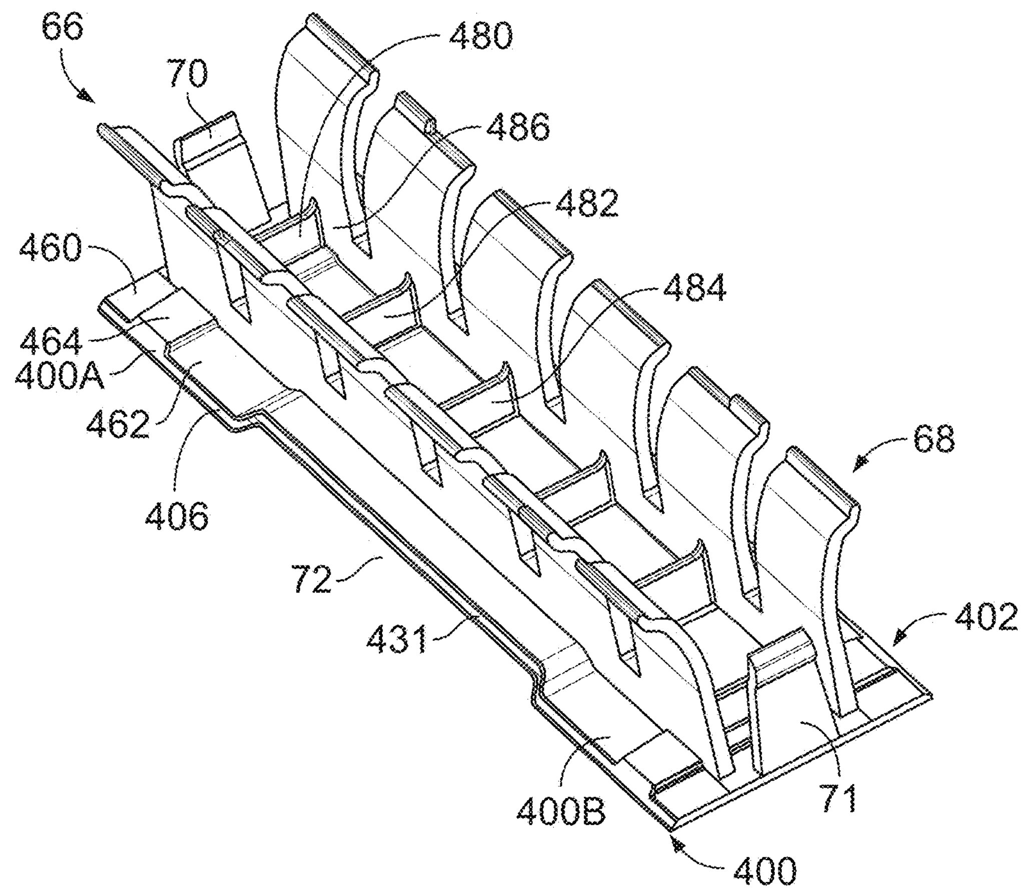
FIG. 7 is a bottom perspective view of the gap blocker of FIG. 6 showing longitudinal bracing walls connecting pairs of longitudinally aligned upstream and downstream leg portions of the gap blocker.

Regarding FIG. 7, the upper upstream contact portion 400 includes upper upstream contact portions 400A, 400B on either side of the upper recess 72. The upper blocking portion 64 has a recessed inclined surface portion 431 that is intermediate the upstream contact portions 400A, 400B and inwardly recessed back therefrom, the recessed inclined surface portion 431 being lower than the lower surface portion 406 (see FIG. 4) when the gap blocker 60 is in the gap 38. The upper blocking portion 64 likewise has a recessed inclined surface portion 430 below the lower surface portion 412 when the gap blocker 60 is in the gap 38. The recessed inclined surface portions 431, 430 are positioned lower than the lower surface portions 406, 412 to be in clearance with the rollers 32, 34 so that the recessed tapered lower surface portions 431, 430 can extend across the grooves 54, 56, 58, 59A below the upper run 170 of the o-ring 44 and inhibit access to the pinch point between the upper run 170 and the groove 58, or the pinch point between the upper run 170 and the groove 54 if the rollers 18 are rotating direction 20B. The recessed inclined surface portion 430 is spaced from, or intermittently slidingly contacts, the cylindrical outer surface 240 of the roller 34 during rotation of the rollers 32, 34 which keeps the recessed inclined surface portion 430 from digging into the cylindrical outer surface 242.

Regarding FIG. 7, the upper upstream and downstream contact portions 400, 402 may each have a crenulated profile for contacting the rollers 32, 34 including recesses 460, 462 on either side of an associated longitudinal rib 464 on the underside of the upper blocking portion 64 of the gap blocker 60. The crenulated profile reduces the surface area of the upper upstream and downstream contact portions 400, 402 in contact with the rollers 32, 34 which reduces the frictional resistance to rotation of the rollers 32, 34 from the gap blocker 60. The upstream and downstream contact portions 400, 402 are at the upstream and downstream ends of the gap blocker 60 to small contact areas between the gap blocker 60 and the rollers 34, 34 while the upper blocking portion 64 spans between the small contact areas to block the gap 38.

Figure 8:
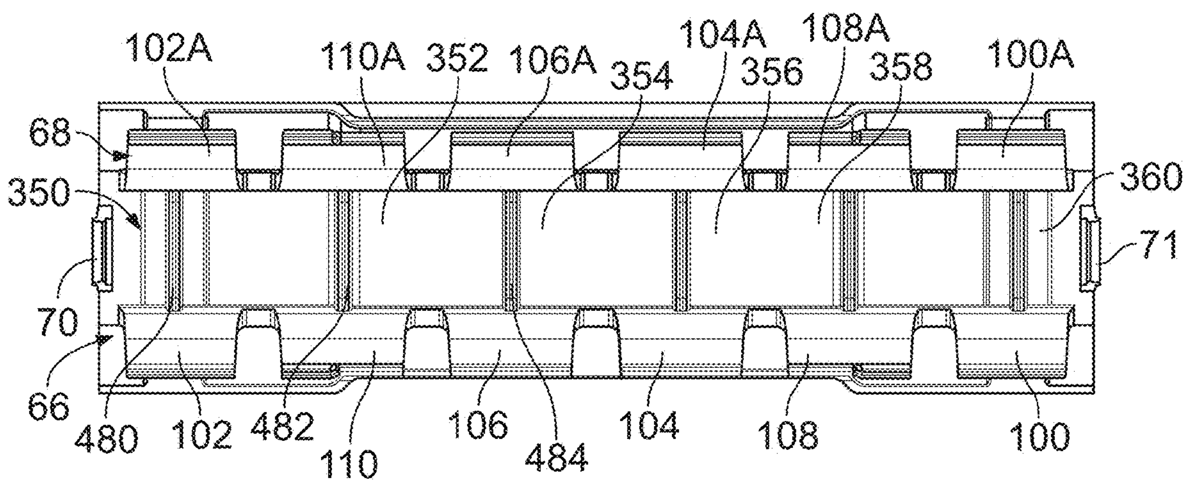
FIG. 8 is a bottom plan view of the gap blocker of FIG. 2 showing a narrowed portion of the upper blocking portion of the gap blocker that provides a barbell-shaped profile of the outer periphery of the blocking portion.

With reference to FIGS. 7 and 8, the gap blocker 60 includes longitudinal bracing walls 480, 482, 484 interconnecting base portions 486 of longitudinally aligned pairs of the upstream and downstream leg portions 66, 68. The walls 480, 482, 484 strengthen the upper portion or half of the gap blocker 60 while being sufficiently short that the upstream and downstream leg portions 66, 68 are still able to deflect particularly at their lower portions as discussed above.

In one embodiment, the gap blocker 60 has a unitary, one-piece construction and may be made of a polymer material, such as ultra-high molecular weight (UHMW) polyethylene or another plastic, that has a low coefficient of friction for low friction contact with the rollers 18. The gap blocker 60 may be formed using, for example, injection molding, extrusion, roll forming, a subtractive manufacturing process, or an additive manufacturing process. The gap blocker 60 may be made of two or more components. For example, a gap blocker in accordance with the present disclosure may be formed by bending sheet metal into a body and using plastic pads on the sheet metal. The plastic pads are used to provide a reduced coefficient of friction between the gap blocker 60 and the rollers 18.

Figure 10:
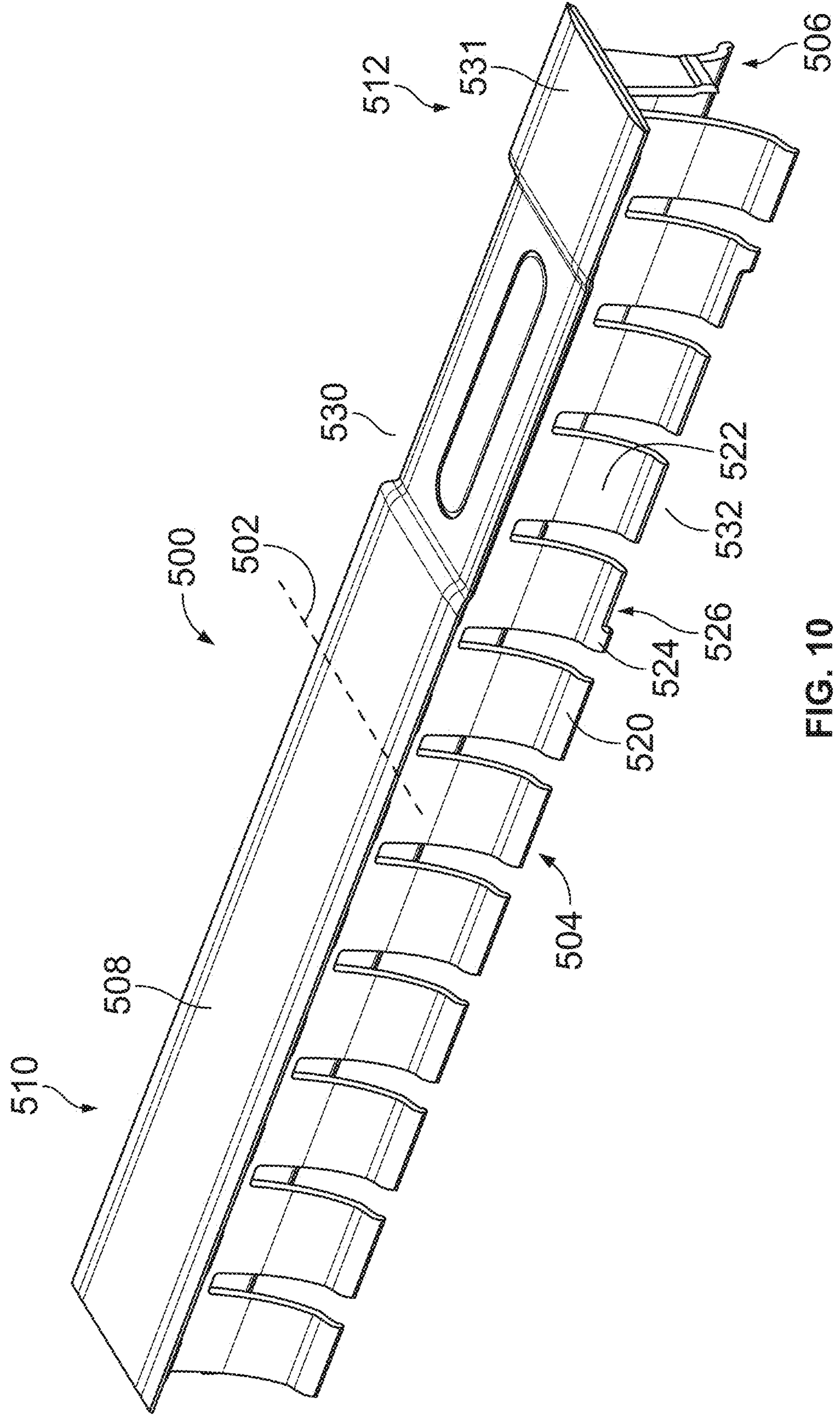
FIG. 10 is a perspective view of a gap blocker having notched legs and an upper recess for providing clearance for upper and lower runs of an o-ring.

Regarding FIG. 10, a gap blocker 500 is provided that is similar in many respects to the gap blocker 60 discussed above. One difference is that the gap blocker 500 is asymmetrical about a central longitudinal axis 502 of the gap blocker 500. More specifically, the gap blocker 500 has a body 508 with upstream and downstream leg portions 504, 506. The gap blocker 500 has a first half 510 and a second half 512 on opposite sides of the central longitudinal axis 502. The upstream and downstream leg portions 504, 506 of the half 512 include longer leg portions 520, shorter leg portions 522, and intermediate leg portions 524 with notched profiles 526. The half 512 has an upper recess 530 formed in an upper blocking portion 531 of the body 508 and a lower recess 532 formed by the intermediate leg portions 524 and shorter leg portions 522. The upper recess 530 and lower recess 532 provide clearance for upper and lower portions of one or more drive members, such as upper and lower runs of an O-ring.

Figure 11:
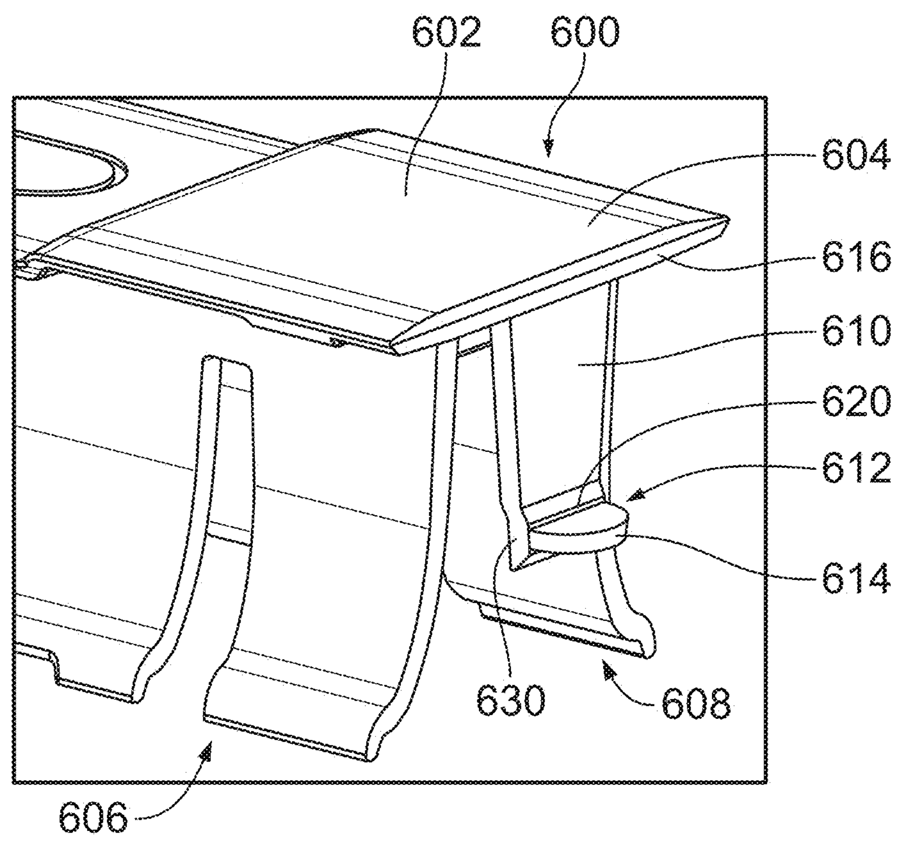
FIG. 11 is a perspective end view of another gap blocker having a removable portion to initially space the gap blocker a predetermined lateral distance from a conveyor structure.

Regarding FIG. 11, a gap blocker 600 is shown that is similar in many respects to the gap blocker 60 discussed above. The gap blocker 600 includes a body 602 having an upper blocking portion 604, upstream and downstream leg portions 606, 608, and a resilient arm 610. The gap blocker 600 has a removable portion 612 with a stop surface 614 for contacting a roller conveyor structure, such as one of the frame side members 14, 16 (see FIG. 1), to keep a lateral side portion 616 of the gap blocker 600 spaced a predetermined lateral distance 660 (see FIG. 12) from the roller conveyor structure. The removable portion 612 protrudes a lateral distance 650 from a contact surface 642 of a lower free end portion 630 of the resilient arm 610 such that there is a distance 660 between the lateral side portion 616 of the upper blocking portion 604 and the roller conveyor structure contacting the stop surface 614. The predetermined distance 660 inhibits formation of a narrow gap between the lateral side portion 616 of the gap blocker 600 and the roller conveyor structure that could catch objects being conveyed by the roller conveyor.

In one embodiment, the gap blocker 600 has a second resilient arm at a lateral side portion of the gap blocker 600 opposite the lateral side portion 616. The second resilient arm has a removable portion that is vertically offset from the removable portion 612 so that an identical, adjacent gap blocker will have a small lateral spacing from the gap blocker 600 if the removable portions of the gap blockers are not removed prior to installation of the gap blockers in a roller conveyor gap. More specifically and with reference to FIG. 12, a resilient arm 643 of an adjacent, identical gap blocker is shown with a removable portion 645 above the removable portion 612 of the gap blocker 600. The removable portion 645 abuts an upper surface 647 of the resilient arm 610, whereas the removable portion 612 abuts a lower surface 649 of the resilient arm 643.

Figure 12:
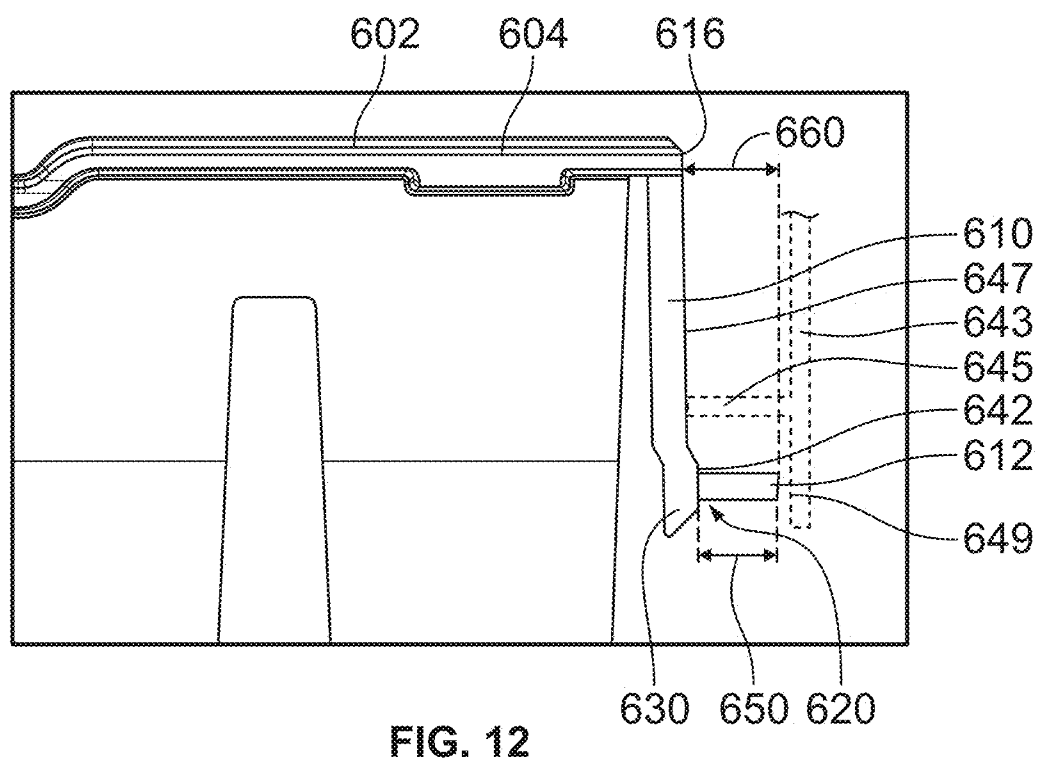
FIG. 12 is a front elevational view of the gap blocker of FIG. 11 showing the removable portion protruding laterally from a resilient arm of the gap blocker.

With reference to FIG. 12, the removable portion 612 has a base portion 620 connected to the contact surface 642 of the resilient arm 610. The base portion 620 may be cut, such as using cutting pliers, to separate the removable portion 612 from the free end portion 630 of the resilient arm 610. The removable portion 612 protrudes normal to the flat contact surface 642 of the resilient arm 610. The flat contact surface 642 may include portions above and below the removable portion 612.

To separate the removable portion 612, an installer may abut a cutting portion of cutting pliers against the contact surface 642 to locate cutting edges of the cutting pliers above and below the base portion 620. The installer then squeeze the handles of the cutting pliers together to cut through the base portion 620.

In one embodiment, the base portion 620 includes a frangible portion such as score line(s), a reduced thickness portion, and/or one or more through openings to facilitate separation of the removable portion 612 from the resilient arm 610.

Once the removable portion 612 has been separated from the resilient arm 610, the contact surface 642 is prepared for contacting the resilient arm of an adjacent gap blocker. In this manner, an installer may remove the removable portion 612 if the gap blocker 600 is to be positioned with the resilient arm 610 in contact with the resilient arm of an adjacent gap blocker having a corresponding removable portion removed. The engagement between contact surface 642 of the resilient arm 610 and corresponding contact surface of the other gap blocker permits the upper blocking portions 604 of the gap blockers to be closely adjacent one another with a minimal lateral spacing therebetween.

Figure 13:
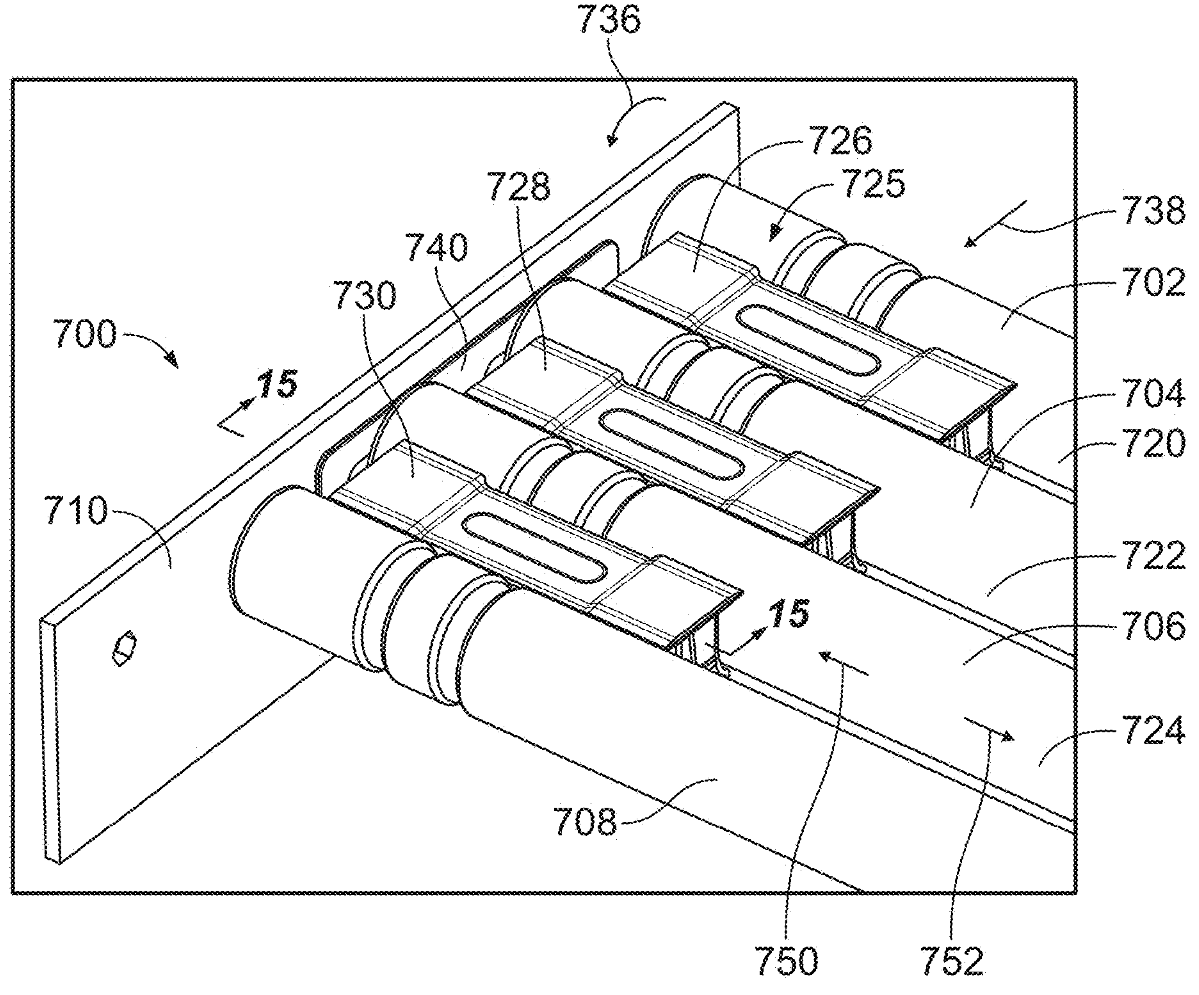
FIG. 13 is a perspective view of a roller conveyor having rollers, gap blockers in gaps between the rollers, and a retainer to keep the gap blockers at predetermined lateral positions along the rollers.

Regarding FIG. 13, a roller conveyor 700 is provided that is similar in many respects to the roller conveyor 10 discussed above. The roller conveyor 700 includes rollers 702, 704, 706, 708 rotatably mounted to a structure, such as a longitudinally extending side frame member 710 of the roller conveyor 700. The roller conveyor 700 includes gaps 720, 722, 724 between the rollers 702, 704, 706 and gap blockers 725 such as gap blocker 726, 728, 730 in the gaps 720, 722, 724. The rollers 702, 704, 706 are rotatable in direction 736 to convey an object in a downstream longitudinal direction 738.

Figure 14:
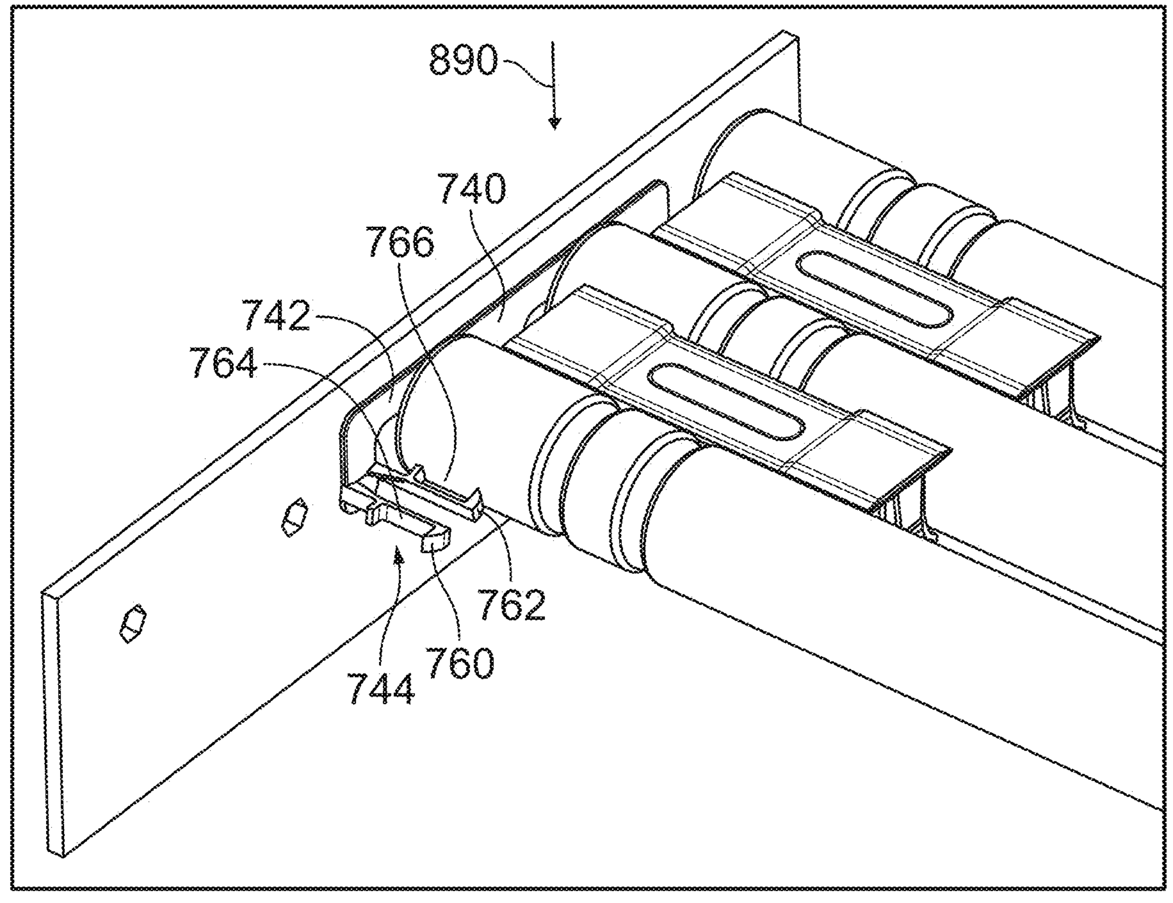
FIG. 14 is a perspective view similar to FIG. 13 showing a downstream roller and gap blocker removed to show a pair of resilient arms of the retainer that engage upstream and downstream legs of the gap blocker.

Regarding FIG. 14, the roller conveyor 700 is shown with the roller 708 and the gap blocker 730 removed to show a retainer 740 of the roller conveyor 700. The retainer 740 includes a mounting portion 742 configured to be mounted to one or more stationary portions of the roller conveyor 700 and an engagement member 744 to space the gap blocker 730 a predetermined lateral distance from the side frame member 710 as well as inhibit movement of the gap blocker 730 in directions 750, 752 as shown in FIG. 13. In one embodiment, the engagement member 744 includes arm portions 760, 762 (see FIG. 14) with recesses 764, 766 that receive upstream and downstream leg portions 770, 772 (see FIGS. 17-19) of the gap blocker 730.

Figure 15:
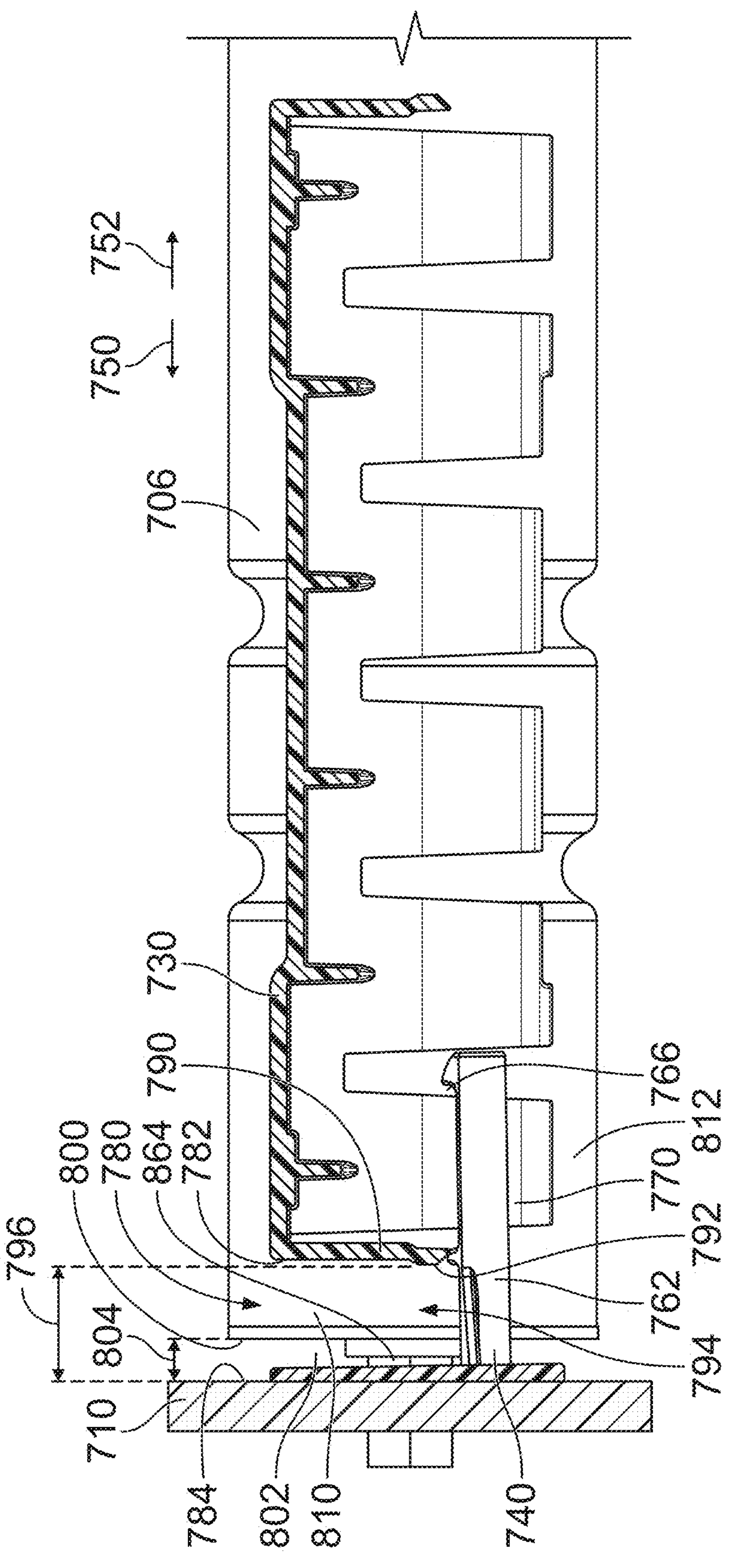
FIG. 15 is a cross-sectional view taken across line 15-15 in FIG. 13 showing one of the resilient arms of the retainer keeping the gap blocker at a predetermined lateral distance from a skirt of the roller conveyor.

Regarding FIG. 15, with the upstream and downstream leg portions 770, 772 of the gap blocker 730 engaged by the arm portions 760, 762, there is a lateral spacing 780 between a lateral side portion 782 of the gap blocker 730 and a laterally inner surface 784 of the side frame member 710. In one example, the lateral side portion 782 includes a resilient arm 790 with a lateral side surface 792 that is spaced a distance 796 from the skirt surface 784. The roller 706 has a lateral side surface 800 with a spacing 802 from the skirt surface 784 by a distance 804. The distance 796 is greater than the distance 804. Due to the larger lateral spacing between the gap blocker 730 and the side frame member 710, there is an exposed surface portion 810 of a cylindrical outer surface 812 of the roller 706 that extends laterally between the lateral side portion 782 of the gap blocker 730 and the side frame member 710. Thus, any object that enters the lateral spacing 780 between the gap blocker 730 and the side frame member 710 contacts the surface portion 810 of the rotating roller 706 and is directed upward, out of the lateral spacing 780. In this manner, the retainer 740 inhibits the gap blocker 730 from being positioned too close to the side frame member 710 and forming a narrow gap therebetween that could provide a catch point for objects traveling along the roller conveyor 700.

Figure 16:
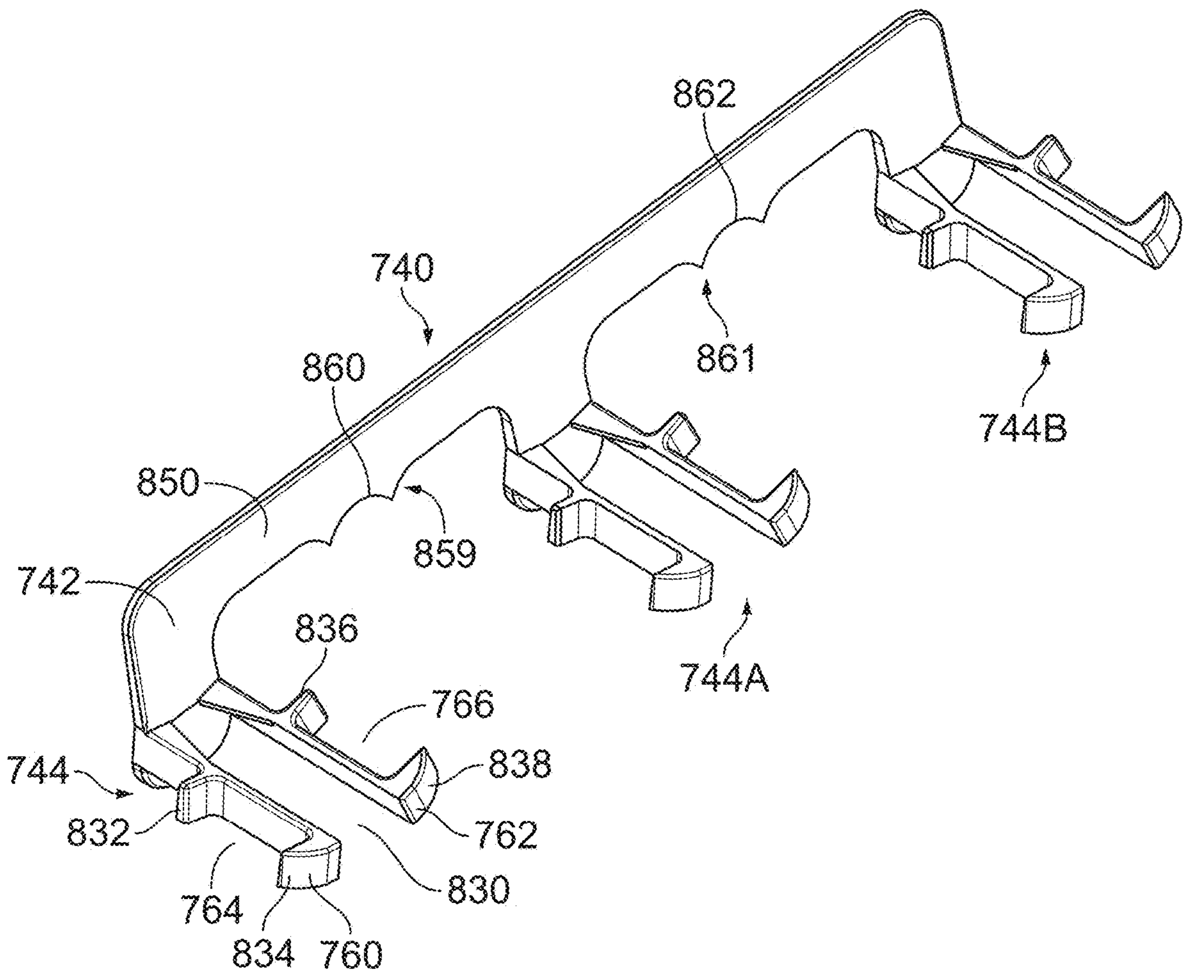
FIG. 16 is a perspective view of the retainer of FIG. 13 showing pairs of resilient arms for engaging gap blockers and saddle portions of the retainer for seating on axles of the rollers.

Regarding FIG. 16, the retainer 740 includes engagement members 744, 740A, 740B that are similar and protrude laterally into the gaps 724, 722, 720 from the mounting portion 742 of the retainer 740. The following discussion will describe the engagement member 744, but applies to the engagement members 744A, 744B as well.

The engagement member 744 includes the arm portions 760, 762 that are resilient and separated by a longitudinal spacing 830. The arm portions 760, 762 include protrusions 832, 834 and 836, 838 that define part of the recesses 764, 766. The mounting portion 742 includes a plate portion 850 with a thickness that is less than the distance 804 (see FIG. 15) such that the plate portion 850 can fit in the spacing 802 between the side frame member 710 and the lateral side surfaces 800 of the rollers 704, 706. The retainer 740 has saddles 859, 861 such as curved portions 860, 862 that rest upon axles 864 (see FIG. 15) of the rollers 704, 706.

To install the retainer 740, the retainer 740 is first lowered in direction 890 (see FIG. 14) to seat the curved portions 860, 862 on the axles 864 prior to positioning of the gap blockers 726, 728, 730 in the gaps 720, 722, 724. The retainer 740 is restrained against lateral movement by portions of the axles 864, such as an enlarged diameter section of the axle 864, as well as the side frame member 710. One or more fasteners, snap-connections, or other approaches may be used to further secure the retainer 740 to the side frame member 710.

Figure 17:
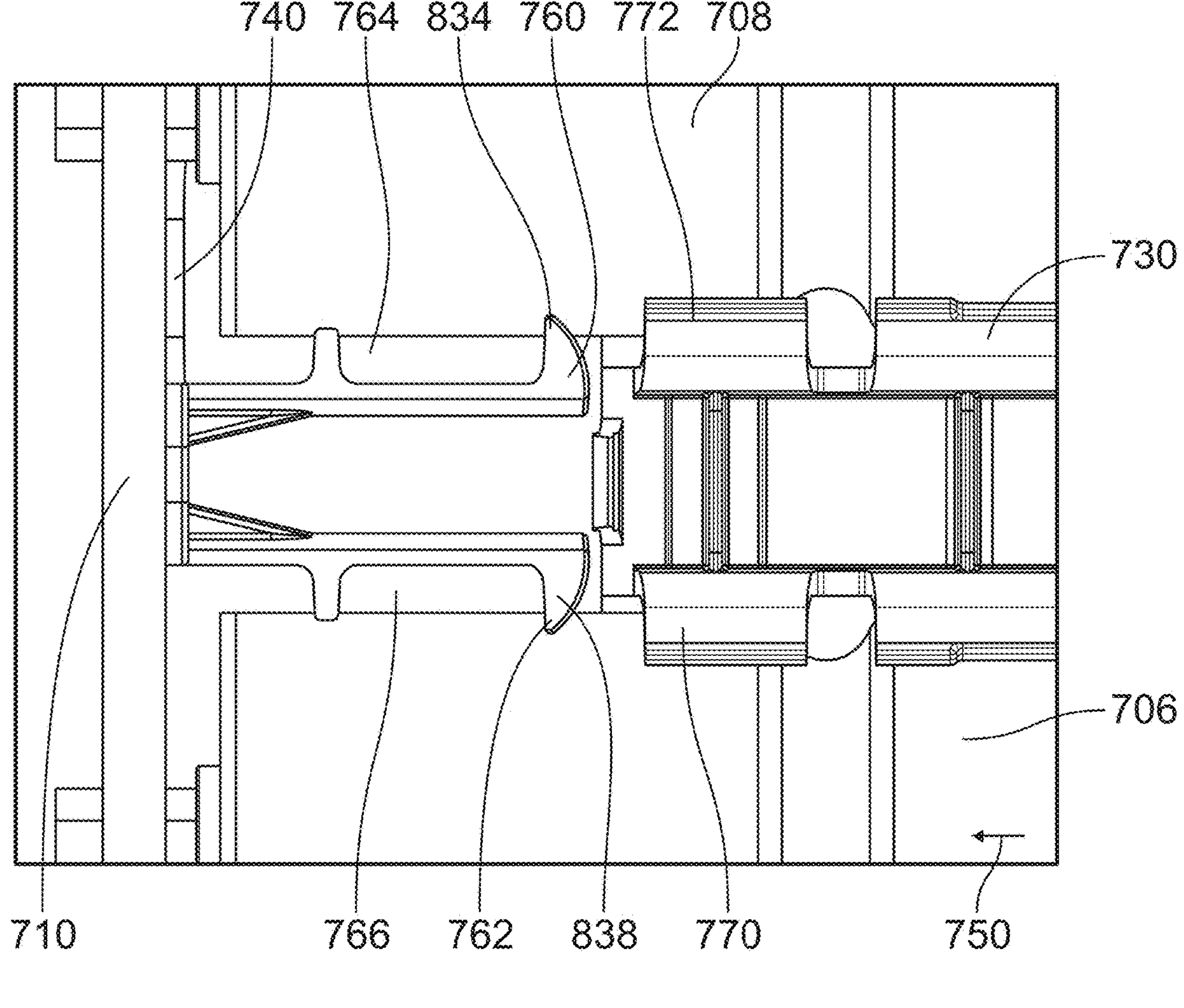
FIGS. 17-19 are a series of bottom views of a portion of the roller conveyor of FIG. 13 showing one of the gap blockers being shifted laterally to snap the arms of the retainer into engagement with upstream and downstream legs of the gap blocker.
Figure 18:
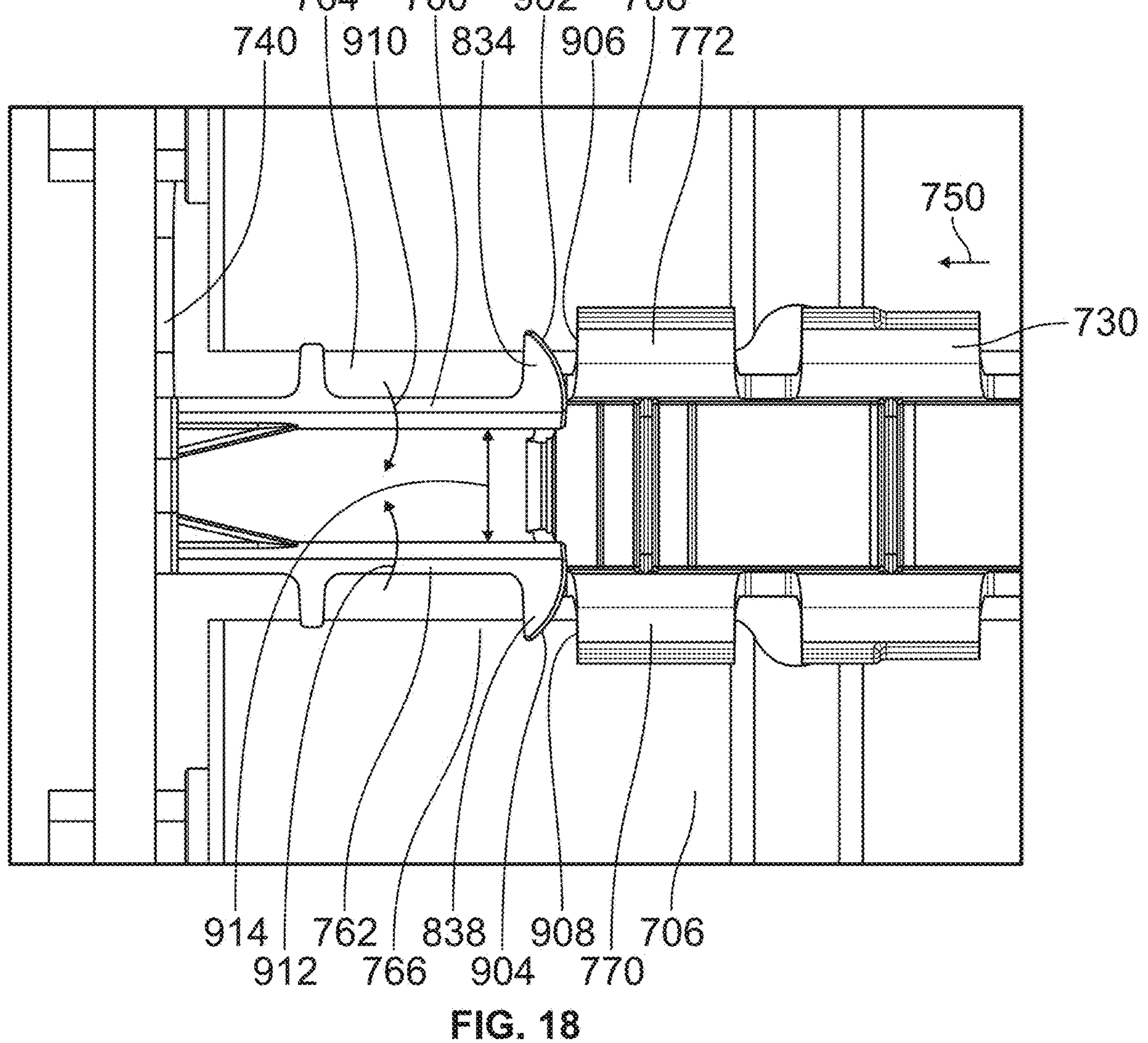

Regarding FIGS. 17-19, the process of connecting the gap blocker 730 to the retainer 740 will be described, but a similar approach may be used for the other gap blockers 726, 728. Initially, the gap blocker 730 is positioned in the gap 724 laterally offset in direction 752 (see FIG. 13) from the retainer 740 once the retainer 740 has been positioned on the axles 864.

Next, the gap blocker 730 is shifted in lateral direction 750 toward the retainer 740. The protrusions 834, 838 have tapered surfaces 902, 904 (see FIG. 18) that are engaged by side surfaces 906, 908 of the leg portions 772, 770 as shown in FIG. 18. The installer continues advancing the gap blocker 730 in direction 750 and causes camming engagement between the tapered surfaces 902, 904 and side surfaces 906, 908 that urges or deflects the arm portions 760, 762 together in directions 910, 912 and narrows a distance 914 therebetween.

Figure 19:
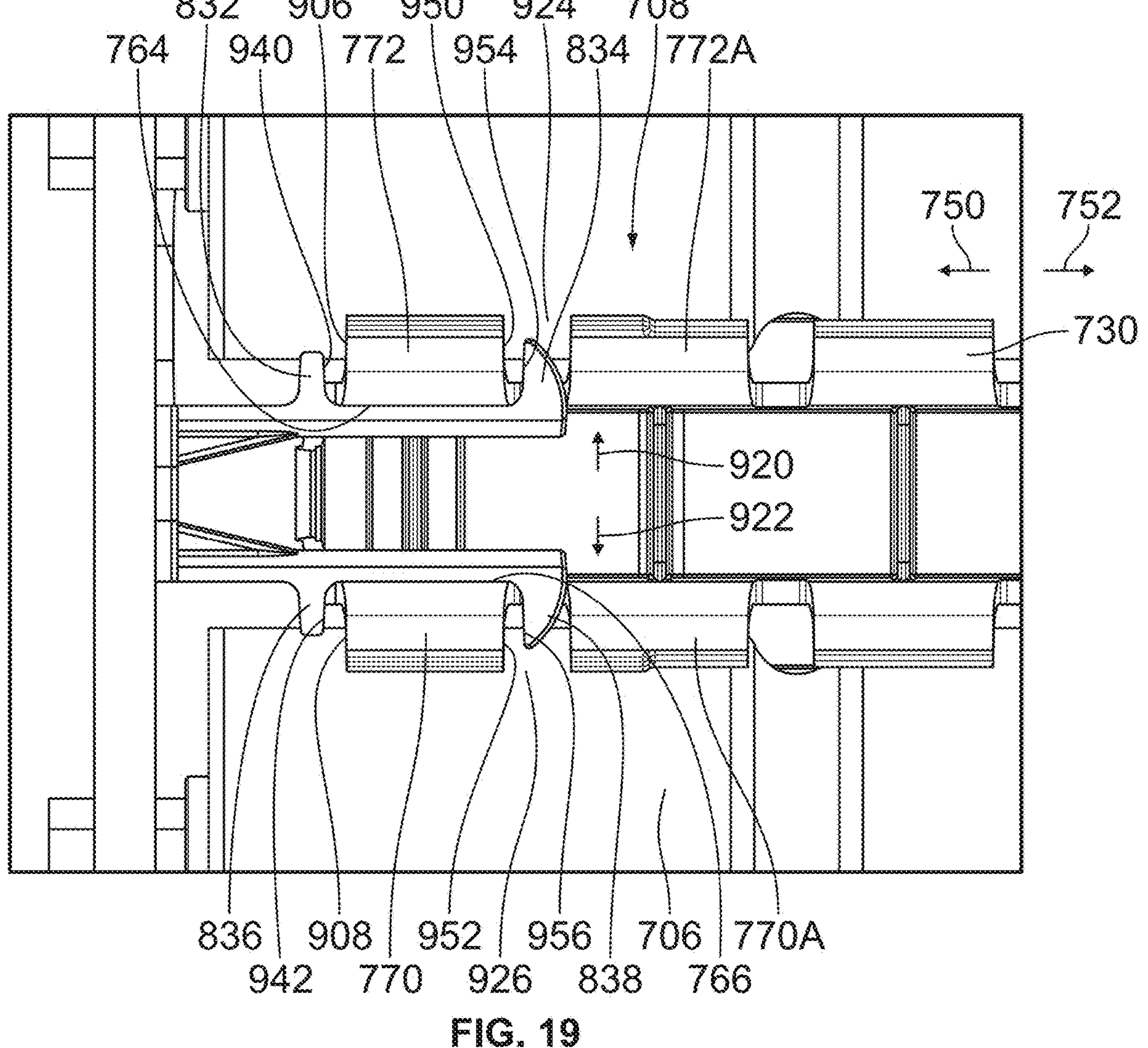

Regarding FIG. 19, the gap blocker 730 has been urged in direction 750 until the protrusions 834, 838 snapped or resiliently returned apart in directions 920, 922 and into recesses 924, 926 between leg portions 772, 772A and leg portions 770, 770A. With the leg portions 770, 772 received in the recesses 764, 766, the side surfaces 906, 908 are positioned to contact stop surfaces 940, 942 of the protrusions 832, 836 to limit further movement of the gap blocker 730 in direction 750. Conversely, the leg portions 770, 772 have side surfaces 950, 952 positioned to contact stop surfaces 954, 956 of the protrusions 834, 838 and limit movement of the gap blocker 730 in direction 752. In this manner, the retainer 740 keeps the gap blocker 730 in position along the rollers 706, 708.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. A gap blocker for a roller conveyor having upstream and downstream rollers for conveying an object in a downstream longitudinal direction and a gap between the upstream and downstream rollers, the gap blocker comprising:

a body configured to be supported in the gap by the upstream and downstream rollers as the upstream and downstream rollers rotate during operation of the roller conveyor;

an upper blocking portion of the body to inhibit the object from falling through the gap;

a plurality of laterally spaced upstream lower members of the body having laterally aligned, upstream lower free end portions to be positioned below a narrowest portion of the gap for keeping the body in the gap;

wherein at least one of the upstream lower free end portions has an upstream recessed portion that is recessed above a lowermost end of one of the other laterally aligned, upstream lower free end portions to provide clearance for a drive member;

a plurality of laterally spaced downstream lower members of the body having laterally aligned, downstream lower free end portions to be positioned below the narrowest portion of the gap for keeping the body in the gap; and wherein at least one of the downstream lower free end portions has a downstream recessed portion that is recessed above a lowermost end of one of the other laterally aligned, downstream lower free end portions to provide clearance for the drive member.

2. The gap blocker of claim 1 wherein the at least one of the upstream lower free end portions includes a plurality of upstream lower free end portions, the upstream recessed portions of the plurality of upstream lower free end portions cooperating to form an upstream lower recess of the upstream lower members to provide clearance for a lower portion of the drive member; and wherein the at least one of the downstream lower free end portions includes a plurality of downstream lower free end portions, the downstream recessed portions of the plurality of downstream lower free end portions cooperating to form a downstream lower recess of the downstream lower members to provide clearance for the lower portion of the drive member.

3. The gap blocker of claim 2 wherein the upper blocking portion includes an upper recess to provide clearance for an upper portion of the drive member, the upper recess above and longitudinally aligned with the lower recesses of the upstream and downstream lower members.

4. The gap blocker of claim 1 wherein the at least one of the upstream lower free end portions includes an upstream projection extending below the upstream recessed portion, the upstream projection having an upstream lowermost end that is level with the lowermost end of the one of the other laterally aligned, upstream lower free end portions; and wherein the at least one of the downstream lower free end portions includes a downstream projection extending below the downstream recessed portion, the downstream projection having an downstream lowermost end that is level with the lowermost end of the one of the other laterally aligned, downstream lower free end portions.

5. The gap blocker of claim 1 wherein the upstream recessed portion extends an entire lateral width of the at least one upstream lower free end; and wherein the downstream recessed portion extends an entire lateral width of the at least one downstream lower free end.

6. The gap blocker of claim 1 wherein the at least one of the upstream lower free end portions has a notched profile; and wherein the at least one of the downstream lower free end portions has a notched profile.

7. The gap blocker of claim 1 wherein the upstream lower members include a pair of upstream lower members and an intermediate upstream lower member between the pair of upstream lower members; and wherein the intermediate upstream lower member includes the at least one upstream lower free end portion having the upstream recessed portion that is above the lowermost ends of the upstream lower free end portions of the pair of upstream lower members.

8. The gap blocker of claim 7 wherein the downstream lower members include a pair of downstream lower members and an intermediate downstream lower member between the pair of upstream lower members; and wherein the intermediate downstream lower member includes the at least one downstream lower free end portion having the downstream recessed portion that is above the lowermost ends of the downstream lower free end portions of the pair of downstream lower members.

9. The gap blocker of claim 1 wherein the at least one of the upstream lower free end portions comprises a plurality of upstream lower free end portions of a plurality of the upstream lower members; and wherein the at least one of the downstream lower free end portions comprises a plurality of downstream lower free end portions of a plurality of the downstream lower members.

10. The gap blocker of claim 1 wherein the upstream lower members include an upstream longer lower member, an upstream shorter lower member, and an upstream transition lower member intermediate the upstream longer lower member and the upstream shorter lower member; and wherein the at least one of the upstream lower free end portions comprises the upstream lower free end portions of the upstream shorter lower member and the upstream transition lower member; and wherein the upstream recessed portions of the upstream lower free end portions of the upstream shorter lower member and upstream transition lower member are above the lowermost end of the upstream lower free end portion of the upstream longer lower member.

11. The gap blocker of claim 10 wherein the downstream lower members include an downstream longer lower member, an downstream shorter lower member, and a downstream transition lower member intermediate the downstream longer lower member and the downstream shorter lower member; and wherein the at least one of the downstream lower free end portions comprises the downstream lower free end portions of the downstream shorter lower member and the downstream transition lower member; and wherein the downstream recessed portions of the downstream lower free end portions of the downstream shorter lower member and downstream transition lower member are above the lowermost end of the downstream lower free end portion of the downstream longer lower member.

12. The gap blocker of claim 1 wherein the at least one of the upstream lower free end portions does not extend radially inward beyond the upstream lower free end portion of the other upstream lower member relative to the upstream roller; and wherein the at least one of the downstream lower free end portions does not extend radially inward beyond the downstream lower free end portion of the other downstream lower member relative to the downstream roller.

13. The gap blocker of claim 1 wherein the body has a unitary, one-piece construction.

14. The gap blocker of claim 1 wherein the upper blocking portion includes an upstream outboard portion and a downstream outboard portion configured to slidingly contact the upstream and downstream rollers as the upstream and downstream rollers rotate during operation of the roller conveyor.

15. A conveyor system comprising the gap blocker of claim 1 in combination with the roller conveyor;

wherein the upstream roller includes an upstream outer cylindrical surface and an upstream groove therein;

wherein the downstream roller includes a downstream outer cylindrical surface and a downstream groove therein; and wherein the drive member is engaged in the upstream and downstream grooves.

16. The conveyor system of claim 15 wherein the gap blocker is radially outward of the upstream groove of the upstream roller and is radially outward of the downstream groove of the downstream roller.

17. A gap blocker for a roller conveyor having upstream and downstream rollers for conveying an object in a downstream longitudinal direction and a gap between the upstream and downstream rollers, the gap blocker comprising:

a body configured to be supported in the gap by the upstream and downstream rollers as the upstream and downstream rollers rotate during operation of the roller conveyor;

an upper blocking portion of the body to be positioned above a narrowest portion of the gap and inhibit the object from falling through the gap;

an upstream lower member of the body having a upstream lower end portion to be positioned below the narrowest portion of the gap to keep the body in the gap;

a downstream lower member of the body having a downstream lower end portion to be positioned below the narrowest portion of the gap to keep the body in the gap;

a lateral biasing member of the body depending from the upper blocking portion;

a lower free end portion of the lateral biasing member; and a removable portion of the lateral biasing member extending laterally from the lower free end portion of the lateral biasing member for contacting a member of the roller conveyor extending longitudinally between the upstream and downstream rollers.

18. The gap blocker of claim 17 wherein the removable portion has a first surface portion for contacting the member of the roller conveyor; and wherein the lateral biasing member is configured to have a second surface portion for contacting an adjacent gap blocker upon removal of the removable portion.

19. The gap blocker of claim 17 wherein the lateral biasing member comprises a resilient arm; and wherein the removable portion comprises a tab protruding from the resilient arm.

20. The gap blocker of claim 17 wherein the lower free end portion has a lower end below the removable portion.

21. The gap blocker of claim 17 wherein the lower free end portion of the lateral biasing member includes at least one flat surface portion for locating a cutting tool to cut the removable portion at a base portion of the removable portion.

22. The gap blocker of claim 17 wherein the free end portion of the lateral biasing member includes a straight wall portion and the removable portion extends perpendicular to and away from the straight wall portion.

23. The gap blocker of claim 17 wherein the body has a unitary, one-piece construction.

* * * * *